United States Patent
Levihn et al.

(10) Patent No.: US 11,555,706 B1
(45) Date of Patent: Jan. 17, 2023

(54) PROCESSING GRAPH REPRESENTATIONS OF TACTICAL MAPS USING NEURAL NETWORKS

(71) Applicant: Apple Inc., Cupertino, CA (US)

(72) Inventors: Martin Levihn, San Jose, CA (US); Jürgen Wiest, Stäfa (CH); Pekka Tapani Raiko, Finland (CH); Anayo Kenechukwu Akametalu, Oakland, CA (US)

(73) Assignee: Apple Inc., Cupertino, CA (US)

( * ) Notice: Subject to any disclaimer, the term of this patent is extended or adjusted under 35 U.S.C. 154(b) by 1093 days.

(21) Appl. No.: 16/143,117

(22) Filed: Sep. 26, 2018

Related U.S. Application Data

(60) Provisional application No. 62/564,160, filed on Sep. 27, 2017.

(51) Int. Cl.
| | |
|---|---|
| *G01C 21/32* | (2006.01) |
| *G05D 1/02* | (2020.01) |
| *G05D 1/00* | (2006.01) |
| *G06N 3/08* | (2006.01) |
| *G06N 3/04* | (2006.01) |

(52) U.S. Cl.
CPC ........... *G01C 21/32* (2013.01); *G05D 1/0088* (2013.01); *G05D 1/0221* (2013.01); *G06N 3/04* (2013.01); *G06N 3/08* (2013.01)

(58) Field of Classification Search
CPC .... G01C 21/32; G05D 1/0088; G05D 1/0221; G06N 3/04; G06N 3/08
See application file for complete search history.

(56) References Cited

U.S. PATENT DOCUMENTS

| | | | |
|---|---|---|---|
| 8,531,293 | B2 | 9/2013 | Putz |
| 8,605,947 | B2 | 12/2013 | Zhang et al. |
| 8,706,298 | B2 | 4/2014 | Goulding |
| 8,903,588 | B2 | 12/2014 | Schmudderich et al. |
| 8,912,978 | B2 | 12/2014 | Szczerba et al. |
| 10,345,447 | B1 | 7/2019 | Hicks |
| 10,394,243 | B1 | 8/2019 | Ramezani et al. |

(Continued)

FOREIGN PATENT DOCUMENTS

| | | |
|---|---|---|
| EP | 3300002 A1 * | 3/2018 |

OTHER PUBLICATIONS

U.S. Appl. No. 15/988,929, filed May 24, 2018, Juergen Wiest.

(Continued)

*Primary Examiner* — Anne Marie Antonucci
*Assistant Examiner* — Jingli Wang
(74) *Attorney, Agent, or Firm* — Robert C. Kowert; Kowert, Hood, Munyon, Rankin & Goetzel, P.C.

(57) ABSTRACT

A graph representation of a tactical map representing a plurality of static components of an environment of a vehicle is generated. Nodes of the graph represent static components, and edges represent relationships between multiple static components. Different edge types are used to indicate respective relationship semantics among the static components. Individual nodes are represented as having the same number and types of edges in the graph. Using the graph as input to a neural network based model, a set of results is obtained. A motion control directive based at least in part on the results is transmitted to a motion-control subsystem of the vehicle.

20 Claims, 12 Drawing Sheets

(56) References Cited

U.S. PATENT DOCUMENTS

| | | | |
|---|---|---|---|
| 10,482,572 | B2 | 11/2019 | Hotson et al. |
| 2010/0106603 | A1* | 4/2010 | Dey ................ G08G 1/096888 |
| | | | 705/14.63 |
| 2010/0191391 | A1 | 7/2010 | Zeng |
| 2010/0228476 | A1 | 9/2010 | Bar-Zeev et al. |
| 2010/0253493 | A1 | 10/2010 | Szczerba et al. |
| 2010/0253539 | A1 | 10/2010 | Seder et al. |
| 2011/0190972 | A1 | 8/2011 | Timmons et al. |
| 2013/0210405 | A1 | 8/2013 | Whipple et al. |
| 2014/0064624 | A1 | 3/2014 | Kim et al. |
| 2014/0324327 | A1* | 10/2014 | Aragon ................ G01C 21/26 |
| | | | 701/117 |
| 2016/0009627 | A1 | 1/2016 | Zhu et al. |
| 2016/0174902 | A1 | 6/2016 | Georgescu et al. |
| 2017/0045370 | A1* | 2/2017 | Weiland ................ G06F 16/50 |
| 2017/0166487 | A1 | 6/2017 | Lazur |
| 2018/0120843 | A1* | 5/2018 | Berntorp ................ G06V 20/56 |
| 2018/0173240 | A1 | 6/2018 | Fang et al. |
| 2018/0345958 | A1 | 12/2018 | Lo et al. |
| 2019/0049970 | A1 | 2/2019 | Djuric et al. |
| 2019/0346854 | A1 | 11/2019 | Slutsky et al. |
| 2019/0353778 | A1 | 11/2019 | Slutsky et al. |

OTHER PUBLICATIONS

David I. Shuman, et al., "The Emerging Field of Signal Processing on Graphs", IEEE, IEEE Signal Processing Magazine, May 2013, pp. 83-98.

Joan Bruna, et al., "Spectral Networks and Deep Locally Connected Networks on Graphs", arXiv: 1312.6203V3, May 21, 2014, pp. 1-14.

Thomas N. Kipf, et al., Semi-Supervised Classification with Graph Convolutional Networks, arXiv:1609.02907v4, Feb. 22, 2017, pp. 1-14.

Michaël Defferrard, et al., "Convolutional Neural Networks on Graphs with Fast Localized Spectral Filtering", arXiv: 1606.09375v3, Feb. 5, 2017, pp. 1-9.

Adam Santoro, et al., "A simple neural network module for relational reasoning", arXiv: 1706.01427v1, Jun. 5, 2017, pp. 1-16.

Vincenzo Di Massa, et al., "A Comparison between Recursive Neural Networks and Graph Neural Networks", The 2006 IEEE International Joint Conference on Neural Network Proceedings, IEEE, 2006, pp. 1-8.

Bryan Perozzi, et al., "DeepWalk: Online Learning on Social Representation", arXiv: 1403.6652v2, Jun. 27, 2014, pp. 1-10.

Franco Scarselli, et al., "The graph neural network model", 2009, University of Wollongong Australia, IEEE Transactions on Neural Networks, vol. 20, No. 1, pp. 61-80.

David Duvenaud, et al., "Convolutional Networks on Graphs for Learning Molecular Fingerprints", arXiv: 1509.09292v2, Nov. 3, 2015, pp. 1-9.

Yujia Li, et al., "Gated Graph Sequene Neural Networks", arXiv: 1511.05943v3, May 3, 2016, Published in ICLR 2016, pp. 1-20.

Peter Ondruska, et al., "End-to-End Tracking and Semantic Segmentation Using Recurrent Neural Network", arXiv: 1604.05091, 2016, pp. 1-9.

Yichuan Tang, et al., "Learning Stochastic Feedforward Neural Networks", Advances in Neural Information Processing Systems, 2013, pp. 1-9.

Shaosheng Cao, et al., "Deep Neural Networks for Learning Graph Representations", Proceedings of the Thirtieth AAAI Conference on Artificial Intelligence (AAAI-16), pp. 1145-1152.

Max Jaderberg, et al., "Reinforcement Learning with Unsupervised Auxiliary Tasks", arXiv: 1611.05397v1, Nov. 16, 2016, pp. 1-14.

Isaac Dykeman, "Conditional Variational Autoencoders", Retrieved from http://ijdykeman.github.io/ml/2016/12/21/cvae.html on Mar. 16, 2017, pp. 1-12.

Diederik P. Kingma, et al., "Auto-Encoding Variational Bayes", arXiv: 1312.6114v10, May 1, 2014, pp. 1-14.

Heiga Zen, et al., "Deep Mixture Density Networks for Acoustic Modeling in Statistical Parametric Speech Synthesis", 2014 IEEE international conference on acoustics, speech and signal processing (ICASSP). IEEE, 2014, pp. 1-5.

Werner Uwents, et al., "A Comparison between Neural Network Methods for Learning Aggregate Functions", International Conference on Discovery Science. 2008, pp. 88-99.

Alberto Testolin, et al., "Probabilistic Models and Generative Neural Networks: Towards on Unified Framework for Modeling Normal and Impaired Neurocognitive Functions", Frontiers in Computational Neuroscience, Jul. 2016, vol. 10, Article 73, pp. 1-9.

Dietmar Kasper, et al., "Object-Oriented Bayesian Networks for Detection of Lane Change Maneuvers", Intelligent Transportation Systems Magazine, vol. 4, No. 1, Jan. 2012, pp. 1-10.

Wikipedia, "Mixture distribution", Retrieved from https://en.wikipedia.org/wiki/Mixture_distribution on Mar. 16, 2017, pp. 1-8.

Wikipedia, "Multi-task learning", Retrieved from https://en.wikipedia.org/wiki/Multitask_learning on Mar. 20, 2017, pp. 1-11.

Christopher M. Bishop, "Mixture Denisty Networks", Feb. 1994, Neural Computing Research Group Report: NCRG/94/004, pp. 1-26.

Kihyuk Sohn, et al., "Learning Structured Output Representation using Deep Conditional Generative Models", Advances in neural information processing systems 2015, pp. 1-9.

Caglar Gulceher, et al., "Learned-Norm Pooling for Deep Feedforward and Recurrent Neural Networks", arXiv: 1311.1780v7, Sep. 2, 2014, pp. 1-17.

Julie Dequaire, et al., "Deep Tracking on the Move: Learning to Track the World from a Moving Vehicle using Recurrent Neural Networks", xrXiv: 1609.09365v2, Feb. 9, 2017, pp. 1-8.

Eike Rehder, et al., "Goal-Directed Pedestrian Prediction", Proceedings of the IEEE International Conference on Computer Vision Workshops. 2015, pp. 50-58.

Carl Doersch, "Tutorial on Variational Autoencoders", arXiv: 1606.059082v2. Aug. 13, 2016, pp. 1-23.

\* cited by examiner

PROCESSING GRAPH REPRESENTATIONS OF TACTICAL MAPS USING NEURAL NETWORKS

This application claims benefit of priority to U.S. Provisional Application No. 62/564,160 filed Sep. 27, 2017, which is hereby incorporated by reference in its entirety.

BACKGROUND

Technical Field

This disclosure relates generally to systems and algorithms for reasoning, decision making and motion planning with respect to controlling the motion of autonomous or partially autonomous vehicles.

Description of the Related Art

Motorized vehicles which are capable of sensing their environment and navigating to destinations with little or no ongoing input from occupants, and may therefore be referred to as "autonomous" or "self-driving" vehicles, are an increasing focus of research and development. Until relatively recently, due to the limitations of the available hardware and software, the maximum speed at which computations for analyzing relevant aspects of the vehicle's external environment could be performed was insufficient to enable non-trivial navigation decisions to be made without human guidance. Even with today's fast processors, large memories, and advanced algorithms, however, the task of making timely and reasonable decisions (which are based neither on excessively pessimistic assumptions, nor on excessively optimistic assumptions) regarding an autonomous vehicle's trajectory in the context of unpredictable behaviors of other entities (such as other drivers or other autonomous vehicles) and incomplete or noisy data about static and dynamic components of the vehicle's environment remains a significant challenge.

SUMMARY OF EMBODIMENTS

Various embodiments of methods and apparatus for analyzing graph representations of tactical maps for autonomous vehicles using neural network-based machine learning models are described. According to some embodiments, a tactical map may comprise information about various static components of a vehicle's operating environment, such as road lane segments, intersections, and so on. The information included in a tactical map may indicate attributes or properties of individual static components as well as various types of relationships (e.g., geometric or topological relationships) that may exist among the static components. From the raw tactical map, a homogenized graph representation may be generated in various embodiments, suitable for processing by a neural network model which has been trained to perform reasoning on graphs or graph-like data structures. In the homogenized graph, nodes may represent instances of the static components, and edges may represent relationships (with respective edge types denoting relationships with different semantics). The graph may be considered to be homogenized in various embodiments in that individual nodes may be represented as having the same number of edges with the same edge types as other nodes, arranged in the same order, within the graph representation. In effect, in such embodiments, missing edges among nodes may be represented using connections from such nodes to a special "zero" node. Such homogenization may help to simplify some of the computations performed at the neural network (e.g., by reducing the number of distinct parameters which have to be learned) in some embodiments. The results of the analysis of the graph corresponding to a tactical map may, for example, be combined with results of analyses of other environment components (such as moving vehicles in the vicinity, pedestrians and the like) to make decisions regarding possible or advisable future motions of the vehicle in some embodiments. Such decisions may be implemented by sending the appropriate motion control directives to various subcomponents of the vehicle (such as braking subsystems, turning subsystems, accelerating subsystems, and the like) in such embodiments.

According to at least one embodiment, a method may comprise obtaining a first tactical map associated with an environment of a first vehicle. The first tactical map may indicate at least a plurality of static components of the environment. The method may comprise generating a homogenized graph representation of the first tactical map comprising a plurality of nodes and a plurality of edges. Individual ones of the nodes may represent respective static components, and individual ones of the edges may represent respective relationships between multiple static components (e.g., pairs of static components). An edge type indicative of relationship semantics of a first edge associated with a first node of the graph may differ from an edge type of a second edge associated with the first node. The graph may be constructed such that the number of edges associated with the first node of the graph is equal to the number of edges associated with individual ones of one or more other nodes of the graph. The method may comprise obtaining, using the homogenized graph representation as input to a neural network-based machine learning model, at least a first set of reasoning results pertaining to the first vehicle and one or more static components. The method may also include transmitting, to a motion-control subsystem of the first vehicle, one or more motion-control directives based at least in part on the first set of reasoning results. Over time, in some embodiments, as the vehicle moves during a given journey, additional tactical maps relevant to the current position of the vehicle may be obtained and analyzed analogously using the neural network-based machine learning model.

In at least some embodiments, the neural network-based machine learning model may comprise one or more convolution layers. In one embodiment, a propagation function of a particular convolution layer may comprise a non-linear function applied to a linear combination of nodes with their neighbors (with the various nodes being represented by respective features). In one embodiment, computations of a convolution layer may comprise a summation, over one or more edge types, of a product of at least (a) an adjacency matrix associated with an edge type (b) input received from another layer of the neural network (which, in the case of a first layer of the network, may comprise a feature matrix representing properties of graph nodes) and (c) a vector representing learned weights associated with respective edge types. Other types of neural networks configured to process graph data structures, such as relational neural networks, and/or non-convolutional graph neural networks may be used in some embodiments, e.g., instead of or in addition to neural networks with convolution layers.

According to one embodiment, a system may comprise one or more computing devices. The computing devices may be configured to generate a homogenized graph representation of a tactical map. The tactical map may comprise information pertaining to a plurality of static components of an environment of a vehicle. The homogenized graph representation may comprise a plurality of nodes and a plurality of edges, with individual ones of the nodes representing respective static components, and individual ones of the edges representing respective relationships between multiple static components. An edge type indicative of relationship semantics of a first edge associated with a first node may differ from an edge type of a second edge associated with the first node. The computing devices may also be configured to obtain, using at least a portion of the homogenized graph representation as input, a set of results from a neural network-based machine learning model. One or more motion-control directives based at least in part on the set of results may be transmitted to a motion-control subsystem of the vehicle.

According to some embodiments, a non-transitory computer-accessible storage medium may store program instructions that when executed on one or more processors cause the one or more processors to generate a homogenized graph representation of a tactical map. The tactical map may comprise information pertaining to a plurality of static components of an environment of a vehicle. The homogenized graph representation may comprise a plurality of nodes and a plurality of edges, with individual ones of the nodes representing respective static components, and individual ones of the edges representing respective relationships between multiple static components. An edge type indicative of relationship semantics of a first edge associated with a first node may differ from an edge type of a second edge associated with the first node. The instructions when executed on the processors may further cause the processors to obtain, using at least a portion of the homogenized graph representation as input, a set of results from a neural network-based machine learning model. One or more motion-control directives based at least in part on the set of results may be transmitted to a motion-control subsystem of the vehicle.

BRIEF DESCRIPTION OF DRAWINGS

FIG. 7 is provided as input, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
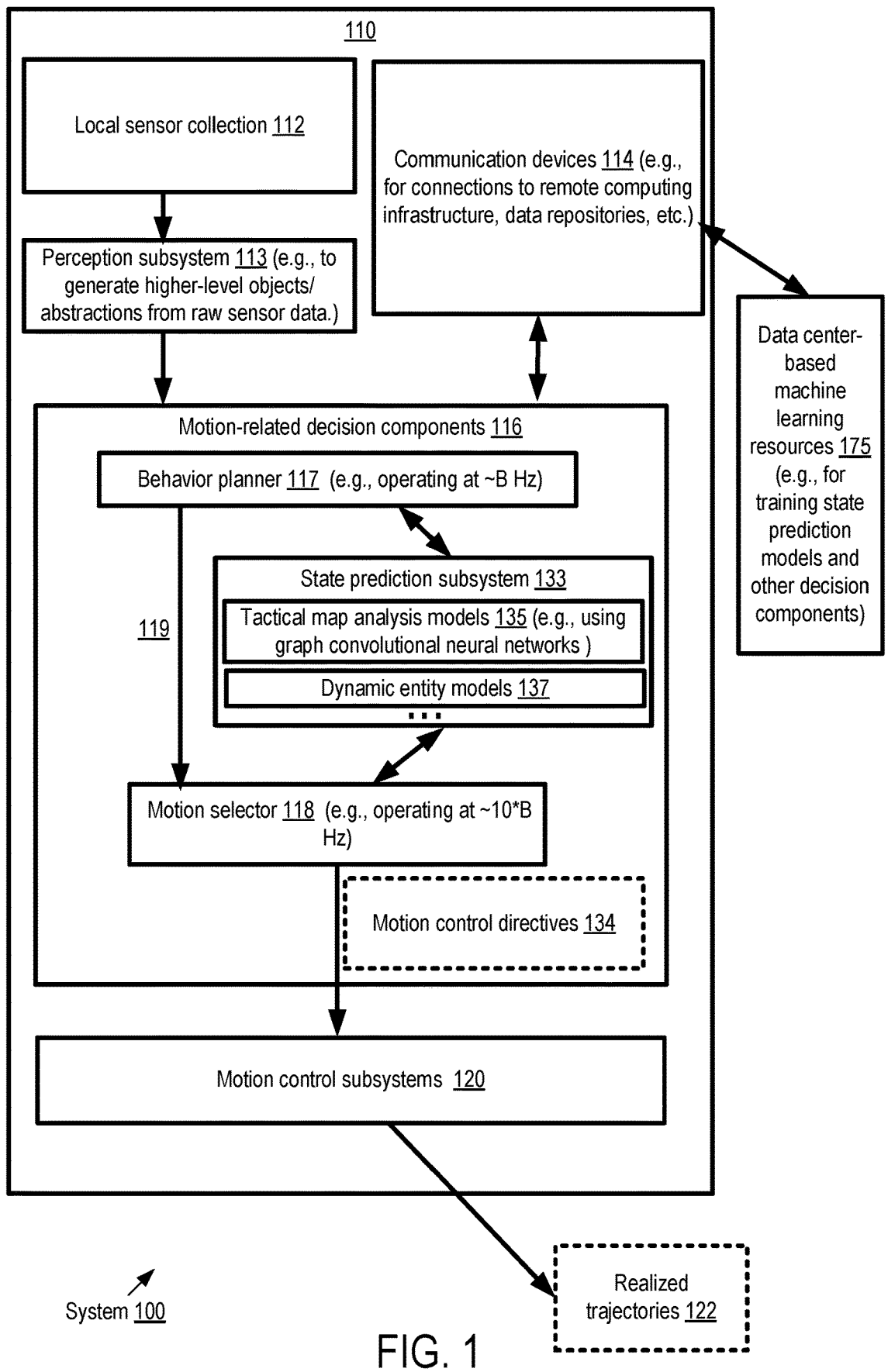
FIG. 1 illustrates an example system environment in which graph representations of tactical maps representing static components of an autonomous vehicle's environment may be analyzed using neural network-based models to help direct the movements of the vehicle, according to at least some embodiments.

FIG. 1 illustrates an example system environment in which graph representations of tactical maps representing static components of an autonomous vehicle's environment may be analyzed using neural network-based models to help direct the movements of the vehicle, according to at least some embodiments. As shown, system 100 comprises an autonomous or partially-autonomous vehicle 110. The term "autonomous vehicle" may be used broadly herein to refer to vehicles for which at least some motion-related decisions (e.g., whether to accelerate, slow down, change lanes, etc.) may be made, at least at some points in time, without direct input from the vehicle's occupants. In various embodiments, it may be possible for an occupant to override the decisions made by the vehicle's decision making components, or even disable the vehicle's decision making components at least temporarily; furthermore, in at least one embodiment, a decision-making component of the vehicle may request or require an occupant to participate in making some decisions under certain conditions. Vehicle 110 may comprise several categories of components in the embodiment depicted in FIG. 1: motion-related decision making components 116, local sensor collection 112, perception subsystem 113, motion control subsystems 120 and communication devices 114. The decision making components 116 may comprise multiple tiers or layers in the depicted embodiment, including but not necessarily limited to a behavior planner 117, a motion selector 118 and a state prediction subsystem 133. In the depicted embodiment, one or more of the decision making components 116 may comprise or utilize machine learning models which are generated or trained at least in part using data center-based machine learning resources 175. As shown, state prediction subsystem 133 may include a plurality of machine learning models, including tactical map analysis model(s) 135 and dynamic entity models 136 in some embodiments.

As discussed below in further detail, an autonomous vehicle 110 may obtain and/or store one or more tactical maps which comprise information about static components of the vehicle's operating environment (including, for example, properties or attributes of the static components and relationships among the static components) in various embodiments. The static components may include, for example, road/highway lane segments, intersections, traffic signs, and the like. During the course of a journey from some location L1 to some destination location L2, a sequence of tactical maps may be obtained or analyzed at the autonomous vehicle using models 135, with each of the tactical maps corresponding to changed intermediate locations of the vehicle 110.

Corresponding to a given tactical map, in various embodiments a homogenized graph representation may be created, in which nodes represent static components of the map, and edges represent relationships. Sub-groups of edges of the graph may have respective edge types indicative of the different semantics of the relationship being represented—e.g., one group of edges may represent the relationship "is-to-the-left-of" between a pair of lane segments LS1 and LS2, another group of edges may represent the relationship "is-to-the-right-of", and so on. The graph may be considered homogenized in that, at least in some embodiments, individual ones of the nodes may have the same number and types of edges associated with them. The node for each static component may be assumed to have a certain set of edges to respective destination nodes representing other static components, and if a static component corresponding to the destination of a particular edge is not present in the input tactical map, then that destination may be set to a special zero node in various embodiments. An edge connecting a given pair of nodes may represent geometric or topological constraints associated with the nodes in various embodiments (e.g., constraints on the distances between the objects representing the nodes, the directions in which the objects are oriented with respect to each other, the heights or elevations of the objects with respect to one another, etc.) Attributes may be associated with nodes as well as with edges—for example, node attributes may include speed limits, while edge attributes may include lane permeability, or rules regarding giving way when changing lanes. The manner in which information about nodes and edges may be encoded numerically in some embodiments is explained in further detail below with the help of a simple example.

The homogenized graph representation of a given tactical map may be provided as input to a neural network-based machine learning model 135 in various embodiments. The model 135 may, for example, have been trained using data center-based training resources 175 in some embodiments to generate predictions (or scores) for responses to various types of queries pertaining to the information contained in a tactical map, such as queries regarding the feasibility of transitions from one lane to another, the paths that can be taken (in terms of consecutively traversed lane segments) to attain some short-term objective, and so on. In at least some embodiments, the set of results generated using the model 135 may be used (e.g., in combination with analysis pertaining to dynamic components of the environment such as other moving vehicles, pedestrians etc., as well as other computations performed at other motion-related decision components 116) to determine the motion-control directives 134 which cause the vehicle to move along a particular trajectory. In various embodiments, the analysis of static infrastructure elements indicated in a tactical map may form a subset of the overall computations needed to help decide upon and achieve the vehicle trajectories.

In the depicted embodiment, the motion control subsystems 120, such as a braking system, acceleration system, turn controllers and the like may collectively be responsible for causing various types of movement changes (or maintaining the current trajectory) of vehicle 110, e.g., in response to directives or commands issued by the motion selector 118 and/or the behavior planner 117 using state predictions obtained from subsystem 133, resulting in the actual or realized trajectory 122. In the tiered approach towards decision making illustrated in FIG. 1, the motion selector 118 may be responsible for issuing relatively fine-grained motion control directives 134 to various motion control subsystems. The rate at which directives are issued to the motion control subsystems 120 may vary in different embodiments—for example, in some implementations the motion selector 118 may issue one or more directives approximately every 100 milliseconds, which corresponds to an operating frequency of about 10 Hertz for the motion selector 118. Of course, under some driving conditions (e.g., when a cruise control feature of the vehicle is in use on a straight highway with minimal traffic) directives to change the trajectory may not have to be provided to the motion control subsystems at some points in time. For example, if a decision to maintain the current velocity of the vehicle is reached by the decision making components based on state predictions from models 133, and no new directives are needed to maintain the current velocity, the motion selector may not issue new directives every T milliseconds even though it may be capable of providing such directives at that rate.

The motion selector 118 may determine the content of the directives to be provided to the motion control subsystems (i.e., whether braking to slow speed by X units is required, whether acceleration by Y units is required, whether a turn or lane change is to be implemented, etc.) based on several inputs in the depicted embodiment, including conditional action and state sequences generated by the behavior planner 117 (as indicated by arrow 119), data obtained from sensor collection 112 via perception subsystem 113, and predictions of future states of the environment of the vehicle 110 generated by subsystem 133. The term "world state" may also be used to refer to the domain over which predictions are generated by subsystem 133 in various embodiments. In at least some embodiments, the world state may include the tactical map, representations of the states of various other moving entities (e.g., nearby vehicles, some of which may also be autonomous or semi-autonomous) as well as stationary objects that could potentially impact the decisions to be made regarding the movements of vehicle 110. In one embodiment, the state prediction subsystem 133 may not necessarily be bundled with the behavior planner 117 and/or the motion selector 118 as part of a decision-making subsystem; instead, the state prediction subsystem 133 may be considered another example of an input source for the decision-making subsystem.

According to at least some embodiments, the task of generating model(s) to be used at subsystem 133 may involve several phases, some of which may be performed continuously or in parallel with others. For example, in various embodiments, data indicating static components of the environment at thousands or millions of locations, data pertaining to the driving behavior of agents controlling vehicles (which may include human drivers as well as autonomous driving systems) under a wide variety of circumstances and external driving conditions, and so on, may be collected over months or years or on an ongoing basis, forming a potentially very large input data set for successive iterations of machine learning model improvements. Respective portions of such data may be in various formats—e.g., in the form of videos or still images collected from on-vehicle cameras or stationary cameras outside vehicles, output from LIDAR (light detection and ranging) devices, radar and other types of local sensors, sensors attached to the vehicle motion control subsystems to capture braking, acceleration and turning patterns, global positioning devices, location sensors based on wi-fi or other signals, and so on. Data may also be collected from various databases such as law repositories for various jurisdictions in which autonomous vehicles are expected to operate, map repositories, accident report databases, motor vehicle or road management departments of governments, and so on.

In various embodiments, the analysis of the tactical maps using models 135 may be combined with the analysis of a varying number of dynamic or moving entities/components of the environment (e.g., the autonomous vehicle for which state information is being collected, other vehicles, pedestrians, bicyclists, and the like) using models 137. Individual ones of the moving entities may be represented using respective state vectors in some embodiments. In at least some embodiments, neural network-based machine learning models may be used for dynamic entities as well as tactical maps (or a single combined neural network model may be trained for analyzing both static and dynamic components/entities). Models 135 and 137 may collectively be used to generate probabilistic predictions regarding future world states in the depicted embodiment.

After a model 135 or 137 has been trained and evaluated, e.g., using data center based resources 175, it may be deployed for execution at one or more autonomous vehicles 110 in the depicted embodiment. In some embodiments, a subset of the model's parameters may be left open or un-finalized at the time of deployment to an autonomous vehicle fleet; values for such parameters may be determined at the autonomous vehicle itself. At the vehicle, input collected from local sensors 112 and communication devices 114 may be provided to the model(s) 133 (as well as to other decision making components such as the behavior planner 117 and motion selector 118). The output predictions of the subsystem 133 may be used at the motion selector and/or the behavior planner to generate motion control directives 134 (such as the logical equivalents of commands to "apply brakes" or "accelerate") in the depicted embodiment, which may be transmitted to the vehicle motion control subsystems 120 to achieve or realize desired movements or trajectories 122. It is noted that in one embodiment, at least a portion of one or more models used for state prediction may be trained at the autonomous vehicle itself, e.g., without requiring resources at remote data centers to be utilized.

Inputs may be collected at various sampling frequencies from individual sensors of the vehicle's sensor collection 112 in different embodiments via an intermediary perception subsystem 113 by the behavior planner 117, the motion selector 118 and/or the subsystem 133. The perception subsystem may generate higher-level objects or abstractions derived from the raw sensor data in various embodiments, which may be more appropriate for analysis by the decision components than the raw sensor data itself. In one embodiment, an intermediary perception subsystem 113 may not be required. Different sensors may be able to update their output at different maximum rates in some embodiments, and as a result the rate at which the output derived from the sensors is obtained at the various decision making components may also vary from one sensor to another. A wide variety of sensors may be included in collection 112 in the depicted embodiment, including externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices and so on. In addition to conventional video and/or still cameras, in some embodiment near-infrared cameras and/or depth cameras may be used. In one embodiment, one or more of the communication devices 114 may also play the role of a sensor—e.g., signals regarding the state and/or plans of other autonomous or non-autonomous vehicles in the vicinity may be collected via any appropriate communication protocol.

In one approach used for managing the movements of vehicle 110, the behavior planner 117 may use the state predictions of subsystem 133 to generate relatively longer-term plans comprising sequences of conditional actions and states which may be reached as a result of the actions, and provide the alternatives together with associated metadata (e.g., reward or value metrics indicating the "relative goodness" of the alternatives based on currently-known information) to the motion selector 118. The plans may be provided at a slower rate to the motion selector 118 than the rate at which directives 134 are expected to be provided to the control subsystems 120 in some embodiments (the slower rate may result, for example, from the amount of computations which have to be performed to generate the alternatives). As shown in the example of FIG. 1, the ratio of the operating frequencies of the motion selector 118 and the behavior planner 117 may be approximately 10:1 in some embodiments (e.g., if the rate at which updated action sequences are provided to the motion selector is approximately B Hertz, the rate at which directives are to be provided to the motion control subsystems may be approximately 10*B Hertz). Other frequency ratios may be used in different embodiments—the ratio shown in FIG. 1 is provided as an example and is not intended to be limiting. In some embodiments, the behavior planner 117 may utilize one or more Monte Carlo Tree Search (MCTS) algorithms to generate the plans to be provided to the motion selector. MCTS is an approach for decision making, sometimes used in automated game player systems, which combines the generality of random simulation with the precision of tree search algorithms often employed in machine learning systems.

In some embodiments, at least some of the computations involved in generating state predictions at driving time of the autonomous vehicle 110 may be performed using remote resources. The communication devices 114 (which may comprise hardware and/or software components used for wireless or telephony-based communication channels of any appropriate types) may be used to transmit and receive the data corresponding to such remote operations, to obtain updates to the models of subsystem 133 and so on. The extent to which decision making is performed locally versus remotely may vary over time in some embodiments—e.g., if communication with a remote facility becomes difficult or unavailable, more decisions (of potentially lower complexity or duration) may be generated locally temporarily, until communication quality is restored. In one embodiment, regardless of whether decisions are generated at least in part locally or not, the communication devices 114 may be used to transmit data about the vehicle's state (and/or local actions taken in various states) to a remote data repository, where the data may later be analyzed and utilized to enhance the model(s) 135 or 137 and/or other decision components 116.

Figure 2:
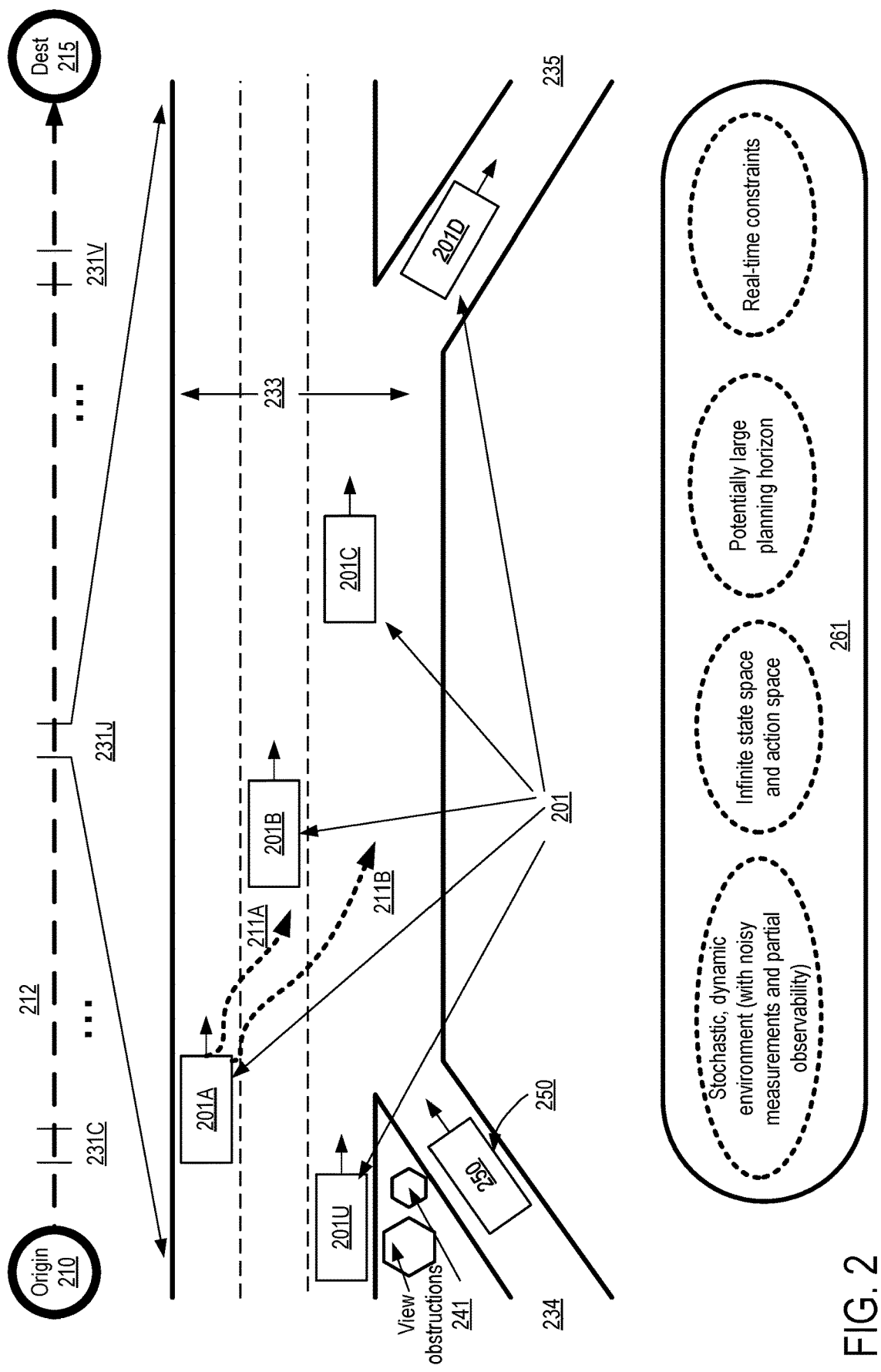
FIG. 2 illustrates an example decision making scenario for an autonomous vehicle, as well as general problem characteristics associated with such decision making scenarios, according to at least some embodiments.

FIG. 2 illustrates an example decision making scenario for an autonomous vehicle, as well as general problem characteristics associated with such decision making scenarios, according to at least some embodiments. A high-level overall route 212 for an autonomous vehicle 250 from an origin 210 to a destination 215 (labeled "Dest" in FIG. 2) may be identified prior to the start of a journey. The high-level route 212 may, for example, be identified using a network-accessible mapping service, and may comprise information such as a proposed set of highways/roads, the exits and entrances to be used for the highways/roads, and so on. In some cases the high-level route 212 may also comprise an estimated or targeted arrival time at the destination 215. The route 212 may comprise numerous sub-portions or route segments 231, such as segments 231C, 231J and 231V. A given segment 231 may represent, for example, an entrance or turn onto some road or highway, some driving distance on the road or highway, and so on. In some embodiments, one or more tactical maps indicating a set of static components (including lane segments) of the environment may be obtained at the vehicle 250 as it traverses a given route segment and analyzed using graph-based modeling techniques similar to those discussed above.

In the depicted example, route segment 213J comprises the use of an entrance ramp 234 by autonomous vehicle to merge into a multi-lane road 233 (the dashed lines indicate lane boundaries). An exit ramp 235 is located within a short distance of the entrance ramp 234 in the example. The entrance ramp 234, exit ramp 235 and various portions of the multi-lane road may be modeled as lane segments of a tactical map in various embodiments, as discussed in further detail below. A number of other vehicles 201 (of which zero or more may be autonomous vehicles), such as vehicles 201A, 201B, 201C, 201D and 201U may be using the road 233 at or just before vehicle 250 is to enter the road, and may be close enough to the entrance ramp to be considered pertinent to the motion decisions made for vehicle 250. The general directions of motion of the vehicles 201 and 250 are indicated by the arrows—e.g., most of the vehicles shown are assumed to be generally proceeding from left to right in the view shown in FIG. 2. The decisions which need to be made with respect to autonomous vehicle 250 may include, for example, the speed at which the road should be entered, how long the vehicle 250 should remain in any given lane immediately after entering the road, whether and to what extent the vehicle's speed should be changed after the entrance, and so on.

Although experienced human drivers may find these kinds of decisions fairly straightforward to make, the task of automating such decisions in a timely and safe manner may be complicated. The general problem of making motion-related decisions for the autonomous vehicle may be summarized as follows. Given some level of understanding or knowledge about the "world" (the nearby static and dynamic environment of the vehicle 250, as well as the properties of the vehicle's current position and movements), and given information about the destination 215 (including the high-level route 212), the decision making components of the vehicle 250 may be required to produce a sequence of trajectories for the vehicle that (a) arrive at the destination safely in a timely and efficient manner (e.g., meeting some desired fuel or battery usage targets), (b) are dynamically feasible (e.g., comply with various applicable physical laws), (c) follow traffic rules, and (d) provide a comfortable experience for the vehicle's occupants. In order to achieve such goals, in at least some embodiments neural network-based models of the kind discussed in the context of FIG. 1 may be used to forecast future states of the world at selected time horizons.

A number of problem characteristics 261 which tend to make the decision making for autonomous vehicles challenging are indicated in FIG. 2. First, the dynamically changing environment of vehicle 250 may be inherently stochastic rather than deterministic, with noisy rather than full and accurate data (such as velocity, position, or heading) available with respect to other vehicles 201 and other relevant objects (such as debris in the road, potholes, signs, etc.). In some cases, one or more objects 241 may partially block a view of the road. As a result, one or more vehicles such as 201U may be partially or fully unobserved during the time period in which the merge-related decisions for vehicle 250 may have to be made. Furthermore, the intentions or goals of other agents (e.g., the drivers of vehicles 201, or the decision making components of those vehicles 201 which happen to be automated vehicles) may be unknown and difficult to predict. For example, even if the current position and velocity of vehicle 201A is known, the agent controlling vehicle 201A may suddenly change vehicle 201A's trajectory to a different lane, as indicated by arrows 211A and 211B, and such a transition may affect the decisions made on behalf of autonomous vehicle 250. Second, many of the metrics or observations which may need to be considered when making the decisions, such as the velocities and relative distances between various vehicles, their relationships to nearby elements of the infrastructure or environment, and so on, may take on continuous rather than discrete values, resulting in a theoretically infinite feasible space of possible states and actions.

The number of sequential actions which may need to be planned may be quite large, resulting in potentially large planning horizons. In principle, to achieve optimal decisions (where the definition of optimality may itself be non-trivial), individual actions and corresponding achievable states may have to be evaluated relative to one another with respect to the goals of the journey, and such comparisons may become computationally intractable depending on the number of alternatives being considered at each stage. Finally, because the vehicle 250 is moving, with a high (and therefore potentially dangerous) level of kinetic energy, the decisions may have to be made within tight real-time constraints, using limited computational resources. These characteristics, taken together, may make motion planning for autonomous vehicles an extremely difficult proposition, which may require a variety of algorithms to be utilized in combination as discussed below, including for example algorithms for reasoning about tactical maps.

Figure 3:
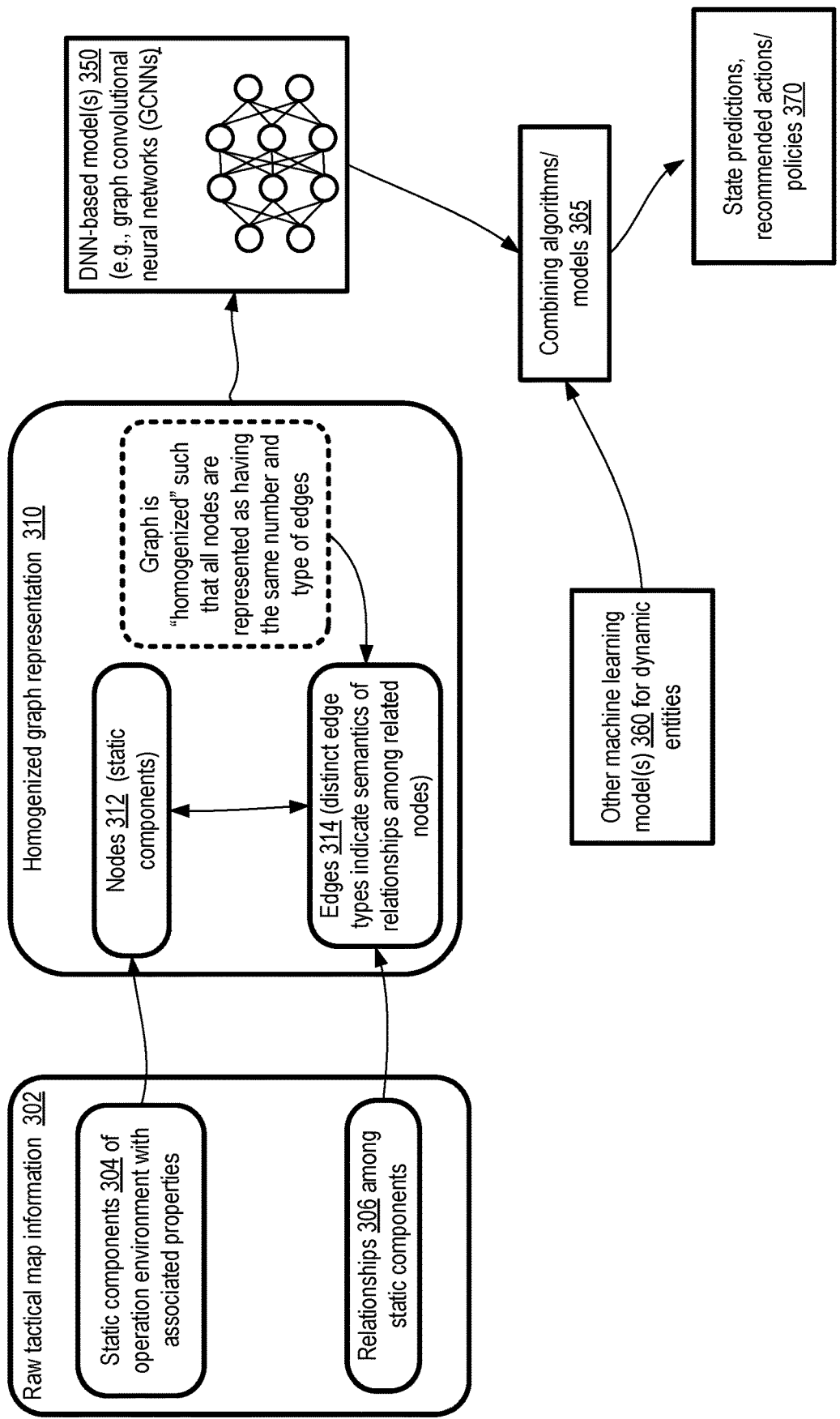
FIG. 3 illustrates an example overview of the processing of tactical maps at an autonomous vehicle, according to at least some embodiments.

FIG. 3 illustrates an example overview of the processing of tactical maps at an autonomous vehicle, according to at least some embodiments. In the depicted embodiment, raw tactical map information 302 for a given location and/or time with respect to a particular vehicle may comprise information about a plurality of static components 304 of the vehicle environment. The number and identifiers of relevant static components such as lane segments, intersections, traffic signs and the like may be included in the raw data in the depicted embodiment, along with various attributes or properties of the individual static components such as (in the case of lane segments) speed limits, recommended speeds, and so on. In addition, the raw tactical map information 302 may comprise information about various types of relationships 306 among pairs (and/or other larger groups, such as triples or quadruples) of the static components. Information about a variety of relationship types, with respective semantics, may be included in the information 302 for a given pair or group of static components. The raw tactical map may be made available to (and/or stored at) the computing devices installed at an autonomous vehicle in various formats in different embodiments, for example in the form of JSON (JavaScript Object Notation) files, XML (Extended Markup Language) files, database entries, custom map representation or markup languages, and so on.

From the raw tactical map, a homogenized graph representation 310 may be produced in various embodiments. The homogenized graph may comprise a plurality of nodes 312 corresponding to individual static components, and a plurality of edges 314 to represent relationships. A given edge 314 may have an edge type or category indicative of the semantics represented by the edge—that is, not all the edges incident on a particular node may have the same edge type. In at least some embodiments, the individual static components and their properties may in some embodiments be represented using a matrix in which each row corresponds to a static component, and each column corresponds to a respective property. The edges may be represented in some embodiments by adjacency matrices. The graph may be considered homogenized in that all the nodes may be represented as having the same number and same types of edges in the depicted embodiment. Thus, for example, if there are N nodes and E possible edge types to consider in one embodiment, E adjacency matrices $A_1, A_2, \ldots, A_E$ may be generated, with each adjacency matrix comprises N rows and N columns to represent possible relationships between each possible pair of nodes. Even if the raw tactical map does not indicate the existence of a relationship of some type t between nodes i and j, the adjacency matrix $A_t$ generated for the edge type t would still contain an [i, j] entry. The value of such an [i, j] entry may be set to zero (or to some selected numerical value), for example, in some embodiments to indicate that information regarding the corresponding relationship was absent in the tactical map.

In the depicted embodiment, a deep neural network (DNN) based model 350 may be trained to reason over graph representations of tactical maps similar to homogenized graph representation 310. Any of a variety of neural network architectures may be employed singly or in combination in different embodiments, such as graph convolutional neural networks (GCNNs), relational networks, non-convolutional graph neural networks, and so on. The DNN-based model(s) 350 may have been trained to produce any of several different types of output in various embodiments, such as responses to queries pertaining to a vehicle and a set of lane segments, operations a vehicle can legally perform with respect to some set of static components of the environment, etc.

The reasoning results pertaining to the static components of the environment, obtained by processing the homogenized graph representation at the DNN-based model(s) 350, may be combined with results obtained from other machine learning models 360 trained for reasoning about dynamic or moving entities/components in the depicted embodiment. Any of a number of different combining algorithms or models 365 may be employed in various embodiments. In one embodiment, different encoding modules may be used for the dynamic objects than is used for the static objects. The outputs of such encoding modules may be fed into a large fully connected neural network layer which outputs a final decision. In other approach employed in some embodiments, the entire environment or "scene" of a vehicle may be treated as a graph that consists of heterogeneous types of objects. In such a graph, in addition to the nodes representing static components such as lane segments, other nodes may be used to represent dynamic components such as other vehicles, pedestrians etc. Each node type may be represented by its own feature vector, and additional edge types may be used to capture relationships between nodes of different types (for example, an edge type that associates a vehicle to a particular lane segment may be introduced, representing a relationship between a dynamic component of the environment and a static component). The entire environment or scene may then be analyzed using a DNN model 350 in various embodiments. Since different node types may have different feature vectors with potentially different lengths, some preprocessing may be needed to create a feature matrix for the entire graph in some embodiments. In one embodiment, such pre-processing may comprise constructing individual feature matrices for each node type, and then creating an aggregate feature matrix by making a block diagonal matrix of the node type feature matrices. In an equivalent approach used in some embodiments, every feature may be assigned to every node, and the ones that are not applicable for a particular node may be set to zero. In at least some embodiments, a set of state predictions, recommended actions or policies 370 may be generated based at least partly on the analysis of the tactical maps and partly on the analysis of dynamic entities. Recommended actions may result in, for example, transmission of motion-control directives to vehicle motion control subsystems as discussed earlier in the context of FIG. 1 in various embodiments.

Figure 4:
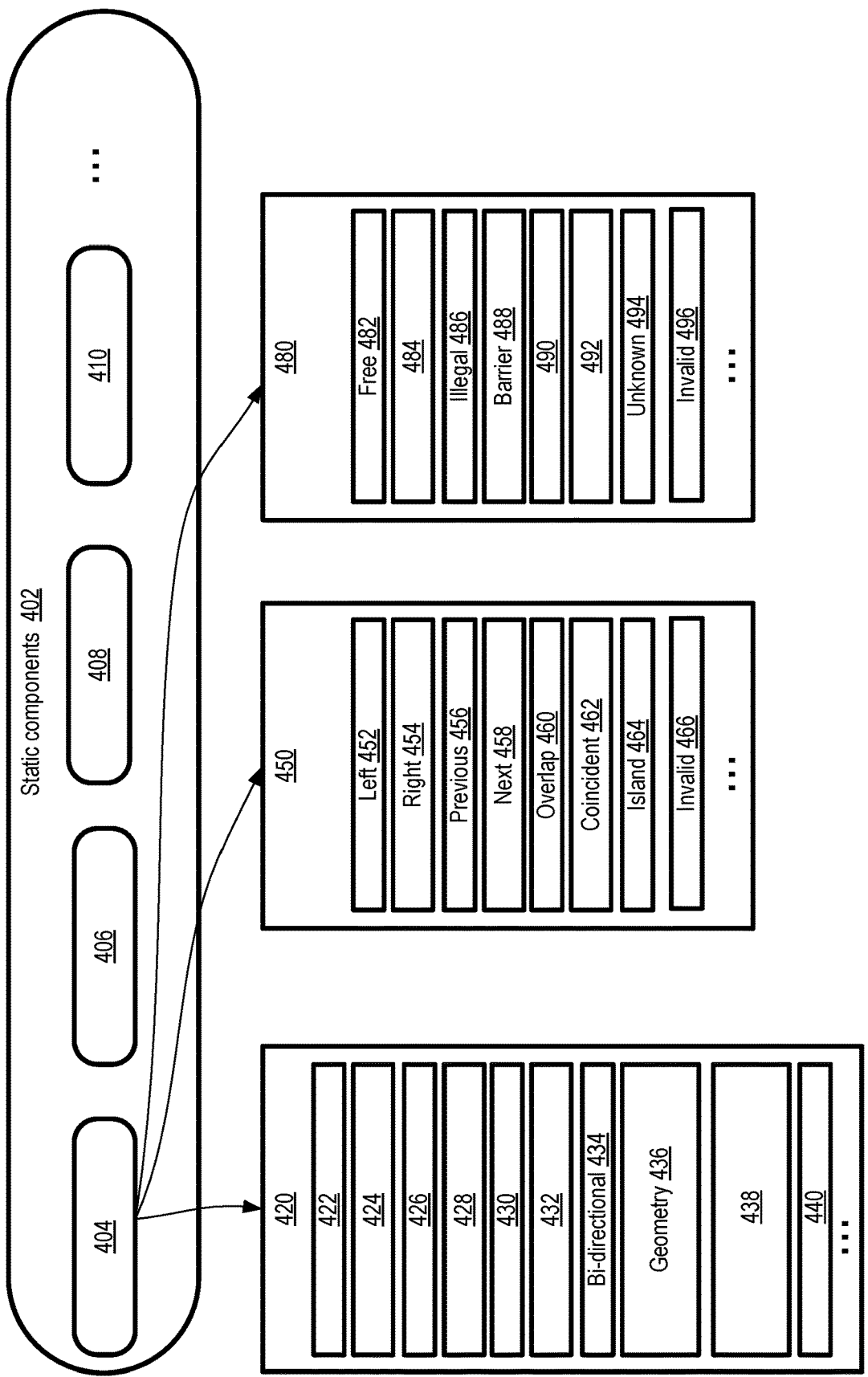
FIG. 4 illustrates example categories of static components of the environment which may be included in a tactical map, as well as examples of properties and relationships of one of the categories, according to at least some embodiments.

FIG. 4 illustrates example categories of static components of the environment which may be included in a tactical map, as well as examples of properties and relationships of one of the categories, according to at least some embodiments. As shown, categories of static components 402 whose analysis may play a role in the planning and control of vehicle movements may include, among others, lane segments 404 (e.g., portions of roads or highways), intersections 406, traffic signs/signals 408, pedestrian walkways 410 and so on. In much of the subsequent description, lane segments may be used as the primary example of static components with respect to which various concepts are explained; it is noted, however, that similar techniques to those discussed with reference to lane segments may be implemented with reference to other types of static components in various embodiments. In one embodiment, for example, a combined homogenized graph representation whose nodes represent instances of any of several different static component categories may be generated (in a manner similar to that discussed in the context of FIG. 3 for combining dynamic and static components in a single graph)—e.g., some nodes may represent lane segments, others may represent intersections, and so on. In other embodiments, separate homogenized graph representations may be created for each type of static component and analyzed using a respective neural network-based model, with the results of the different models being combined (e.g., using a set of fully connected aggregating neural network nodes which consume the respective outputs from each of the component-type-specific neural networks).

In various embodiments, lane segment properties 420 for which respective values may be included in a tactical map for a given lane segment may include, for example, a speed limit 422, a proceed-with-caution indicator 424 (indicating that a vehicle is expected to exercise extra caution while traversing the lane segment), a must-stop indicator 426 (indicating that a vehicle must stop when using the lane segment), a keep-clear indicator 428 (indicating that a vehicle must attempt to keep the lane segment clear), a must-not-enter indicator 430 (indicating that entry into the lane segment is forbidden), a stop-if-able indicator 432 (indicating that a vehicle should stop if possible prior to entering the lane segment), a bi-directional indicator 434 (indicating whether the lane permits bi-directional flow of traffic), one or more lane segment geometry indicators 436 (e.g., left, center and/or right poly lines), a lane type 438 (e.g., whether use of the lane segment is restricted/permitted for vehicles, bicycles, etc.), a recommended speed 440, and so on. Not all the properties 420 indicated in FIG. 4 may be used in some embodiments. Values for other combinations of properties may be included in a tactical map in some embodiments; the properties shown in FIG. 4 are not meant to be restrictive. In the homogenized graph representation of a tactical map, in various embodiments a feature vector indicating the values of the different properties for a given static component may be included, as illustrated by the example shown starting with FIG. 6 below.

In the embodiment depicted in FIG. 4, relationship categories 450 for a given pair of lane segments may include, among others, a left relationship 452 (indicating whether the second lane segment of the pair is to the left of the first lane segment), a right relationship 454 (indicating whether the second lane segment of the pair is to the right of the first lane segment, a previous relationship 456 (indicating whether the second lane segment is a previous lane segment along a particular path with respect to the first lane segment), and/or a next relationship 458 (indicating whether the second lane segment is a next lane segment along a particular path with respect to the first lane segment). In some embodiments, other types of relationship categories may also be represented in a tactical map, such as an overlap relationship 460 indicating whether the second lane segment of a pair overlaps with the first lane segment, a coincident relationship 462 indicating whether the second lane segment is coincident with the first lane segment, an island relationship indicating 464 whether the second lane segment represents a traffic island with respect to the first lane segment, and/or an invalid relationship 466.

In some embodiments, a tactical map may include an indication, with respect to a given pair of lane segments or a single lane segment, of permeability. Lane segment permeability categories 480 may include, for example, free permeability 482, passing/overtaking 484, illegal 486, barrier 488, turn-across 490, bidirectional turn 492, unknown permeability 494, and/or invalid permeability 496 in various embodiments. In at least one embodiment in which permeability information is included, the set of edge types used in the homogenized graph representation of the tactical map may be obtained as a cross-product of at least some of the relationship categories 450 and at least some of the permeability categories 480. Other categories of relationships and/or permeability categories than those shown in FIG. 4 may be used in different embodiments.

Figure 5:
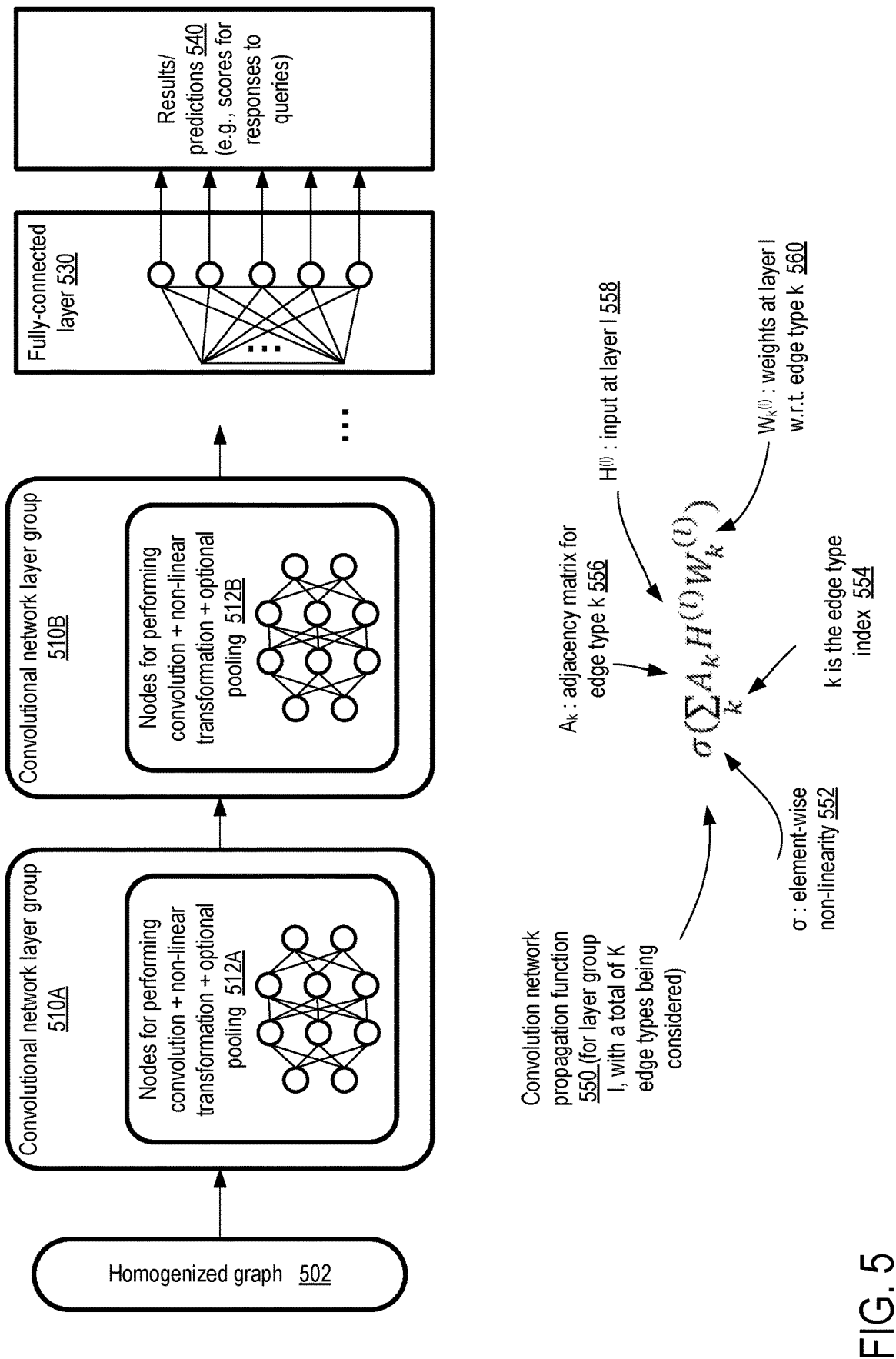
FIG. 5 illustrates an example neural network architecture which may be used to process homogenized graph representations of tactical maps, according to at least some embodiments.

FIG. 5 illustrates an example neural network architecture which may be used to process homogenized graph representations of tactical maps, according to at least some embodiments. A convolutional neural network is illustrated by way of example, comprising an input layer utilizing at least a portion of the homogenized graph representation of a tactical map 502, one or more convolutional network layer groups 510 such as 510A and 510B, and a fully-connected layer 530 at which results/predictions 540 may be generated. Values of various weights, biases and/or other parameters at the different layers may be adjusted using back-propagation during the training phase of the model. In some embodiments, other types of deep neural networks capable of reasoning about graph structures may be used as discussed earlier.

In the depicted embodiment, each convolutional layer group 510 may comprise a set of nodes 512 (artificial neurons) configured to compute convolutions, including a non-linear transformation as indicated by the example propagation function 550 shown for a layer l. The propagation function 550 includes a summation operation to which an element-wise non-linearity $\sigma$ 552 is applied. The summation may be performed for all K edge types being considered (the lowercase letter k is the edge type index 554), and may include the multiplication of an adjacency matrix $A_k$ 556 with an input matrix or vector $H^{(l)}$ 558 for layer l and a set of edge-type-specific learned weights $W_k^{(l)}$ 560.

In the formulation 550 of the propagation function, for a given edge type k, a linear combination across feature channels represented by the columns of $W_k^{(l)}$ is computed, and for each node or row i, $A_k$ only allows contributions from nodes that actually share an edge of type k with the node i. The summation is then performed over all the edge types in the depicted embodiment. Note that each column of $W_k^{(l)}$ may correspond to a different convolution. Note also that Ho (input for the very first layer with index 0) may comprises a feature matrix X representing the static components for which information was included in the tactical map in the depicted embodiment.

In some embodiments it may be observed that the eigenvalues of $A_k$ might be greater than one, which may cause numerical instabilities. In such embodiments, the formulation 550 may be normalized to obtain formulation 550-norm using degree matrices D as follows (D is the degree matrix with $$D_{ii} = \sum_j A_{ij}):$$

Formulation 550-Norm:

$$\sigma\left(\sum_{k=0} D^{-1/2} A_k D^{-1/2} H^{(l)} W_k^{(l)}\right)$$

In one embodiment, the input feature vector X may be transformed or embedded to increase dimensionality: e.g., the transformation $H^{(0)}=\phi(X;\beta)$ may be applied where $\phi$ embeds each row of X into a high dimensional space.

In addition to the computations associated with one or more of the convolution formulations discussed above, in some embodiments a given layer group 510 may comprise pooling-related computations at an optional pooling layer. As shown in FIG. 5, in various embodiments, multiple layer groups 510 may be arranged in sequence, with the output of one layer group such as 510A being consumed as input by the next layer group such as 510B. In some embodiments, a different arrangement of convolutional layers, non-linear transformation layers such as rectifying linear units (ReLUs) and/or pooling layers may be used—e.g., a sequence of layers similar to the following may be used: Convolution (layer #1)-ReLU(#2)-Convolution(#3)-ReLU(#4)-Pooling (#5)-Convolution(#6)-ReLU(#7)-Convolution(#8)-ReLU (#9)-Pooling(#10)-FullyConnected(#11).

Figure 6:
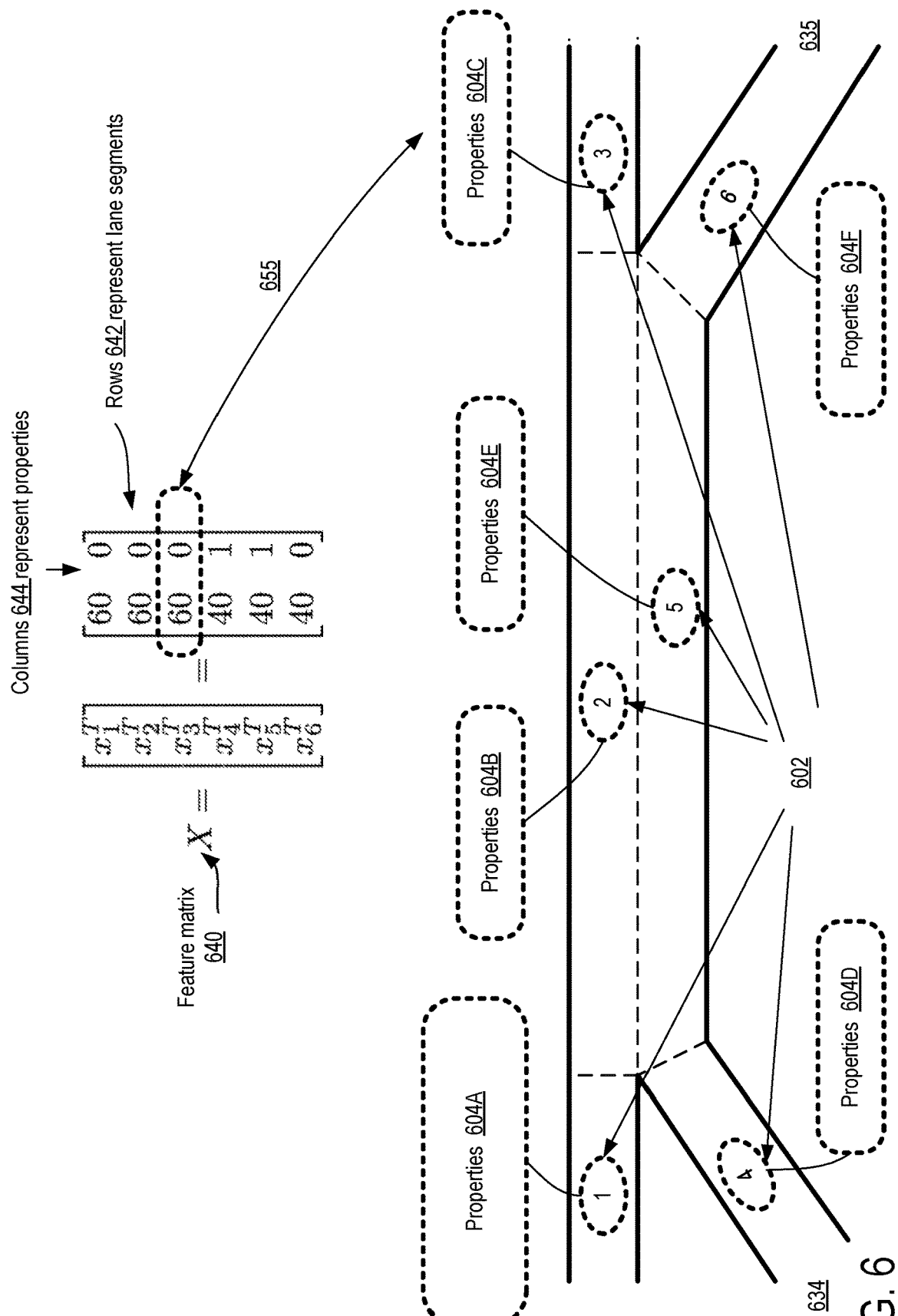
FIG. 6 illustrates a simple example of a feature matrix which may be generated to represent nodes of a homogenized graph corresponding to a tactical map, according to at least some embodiments.

A small-scale example of the types of computations which may be implemented, starting with a tactical map, to generate a homogenized graph representation on which reasoning is performed by a neural network is provided using FIG. 6-FIG. 9. FIG. 6 illustrates a simple example of a feature matrix which may be generated to represent nodes of a homogenized graph corresponding to a tactical map, according to at least some embodiments. In the example scenario, information about six lane segments LS1-LS6, for each of which values of two properties 604 (recommended speed RS and proceed-with-caution indicator PWC) are known, may be included in a tactical map. To keep the example simple, a very small number of static components of a vehicle's environment in the form of these six lane segments is presented, and the number of properties to be considered is also very small. In real-world scenarios, a larger number of static components and properties may be included in a tactical map. In some embodiments, as mentioned earlier, one or more types of static components in addition to lane segments (or instead of lane segments) may be included in at least some tactical maps and the corresponding graph representations.

In the example scenario shown, the RS or recommended speed values may be expressed as integers (e.g., indicating miles-per-hour or kilometers-per-hour), while the PWC or proceed-with-caution indicator may be expressed as a Boolean (e.g., with a "1" value indicating that extra caution is recommended, and a "0" value indicating that normal levels of caution are sufficient). For each of lane segments LS1, LS2 and LS3, as shown by elements 604A-604C respectively, the example tactical map may indicate that RS=60 and PWC=0. For each of lane segments LS4, LS5 and LS6, (as shown by elements 604D-604F) RS=40 while PWC=1. The lane segments LS4-LS6 are more closely associated with entering (via entrance ramp 634) and exiting (via exit ramp 635) the road, which may lead to the need for greater caution and lower recommended driving speeds. The information about the lane segments and their properties may be transmitted to a vehicle moving on one of the six lane segments, or in the vicinity of the six lane segments, in various embodiments via a network connection, or may be stored in advance of a journey at computing devices installed in the vehicle.

A feature matrix X indicated by label 640 may be created to represent the nodes of the graph corresponding to the tactical map in the depicted embodiment. Corresponding to each of the six lane segments, a feature vector xi indicating the RS value and the PWC value may be generated, and the feature vectors may be transposed and combined forming feature matrix X as shown. The rows 642 of X represent individual lane segments, while the columns 644 represent individual properties. The third row from the top, $x_3^T$, represents LS3, for example, as indicated by arrow 655.

Figure 7:
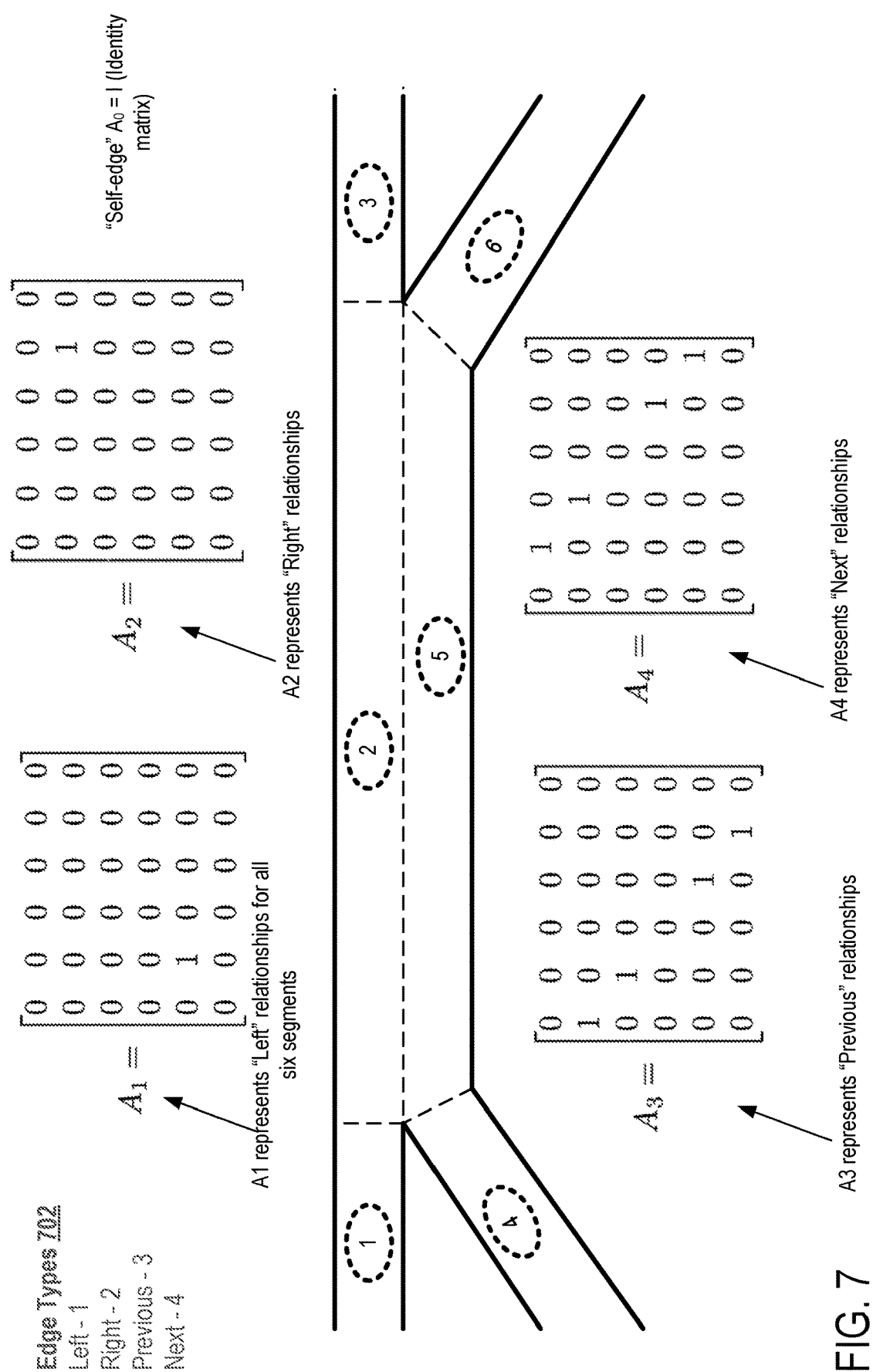
FIG. 7 illustrates a set of adjacency matrices which may be generated to represent edges of the homogenized graph corresponding to the tactical map introduced in FIG. 6, according to at least some embodiments.

FIG. 7 illustrates a set of adjacency matrices which may be generated to represent edges of the homogenized graph corresponding to the tactical map introduced in FIG. 6, according to at least some embodiments. To simplify the example, only four types of relationship semantics among lane segment pairs, with corresponding edge types 702, are considered: Left, Right, Previous and Next edge types. Recall that the example comprises information about six lane segments or nodes. Corresponding to each of the relationship semantics types, a respective 6×6 adjacency matrix A1-A4 may be constructed to represent the edges in the depicted embodiment. The relative position of the entry for a given node is based on the node label—e.g., LS1 is represented by the first row and first column in the adjacency matrices, LS2 is represented by the second row and second column, and so on. The matrix A1 is used for the "Left" relationship, A2 for the "Right" relationship, A3 for the "Previous" relationship and A4 for the "Next" relationship. (The exact meanings or semantics of "Previous" and Next" may be determined by the entity that generates the tactical map—intuitively, for example, a first lane segment may be considered previous to a second lane segment if a vehicle which does not change lanes to the left or right would transition from the first lane segment to the second lane segment in some embodiments). In some embodiments, to simplify convolution-related calculations, a self-edge matrix A0 (the identity matrix of the same dimensions as the A1-A4 matrices) may also be defined as indicated in FIG. 7.

A visual examination of the positional/geometrical arrangement of the six lane segments as shown in FIG. 7 indicates that the only direct "Left" relationship is between segments LS2 and LS5-LS2 is to the left of LS5, and conversely, LS5 is to the right of LS2. Accordingly (assuming row and column numbering starts with 1) only the [row=5, column=2] element of A1 is set to 1, with all other elements being set to zero. Similarly, only the [row=2, column=5] element of A2 (for the "Right" relationship) is set to 1, with all other elements being zero. With respect to the "Previous" relationship, A3 has non-zero values only in elements [2,1], [3,2], [5,4] and [6,5], indicating that LS1 is previous to LS2, LS2 is previous to LS3, LS4 is previous to LS5 and LS5 is previous to LS6. With respect to the "Next" relationship, A4 has non-zero values only in elements [1,2], [2,3], [4,5] and [5,6], indicating that LS2 is next to LS1, LS3 is next to LS2, LS5 is next to LS4 and LS6 is next to LS5. Note that in the homogenized graph representation, there are entries in the adjacency matrices for all pairs of nodes for each of the possible relationship types, even though in the tactical map only information about existing or actual relationships may have been included in the depicted embodiment. In effect, the number and types of edges associated with any given node is made equal to the number and types of edges associated with any other node of the homogenized graph in such embodiments.

Figure 8:
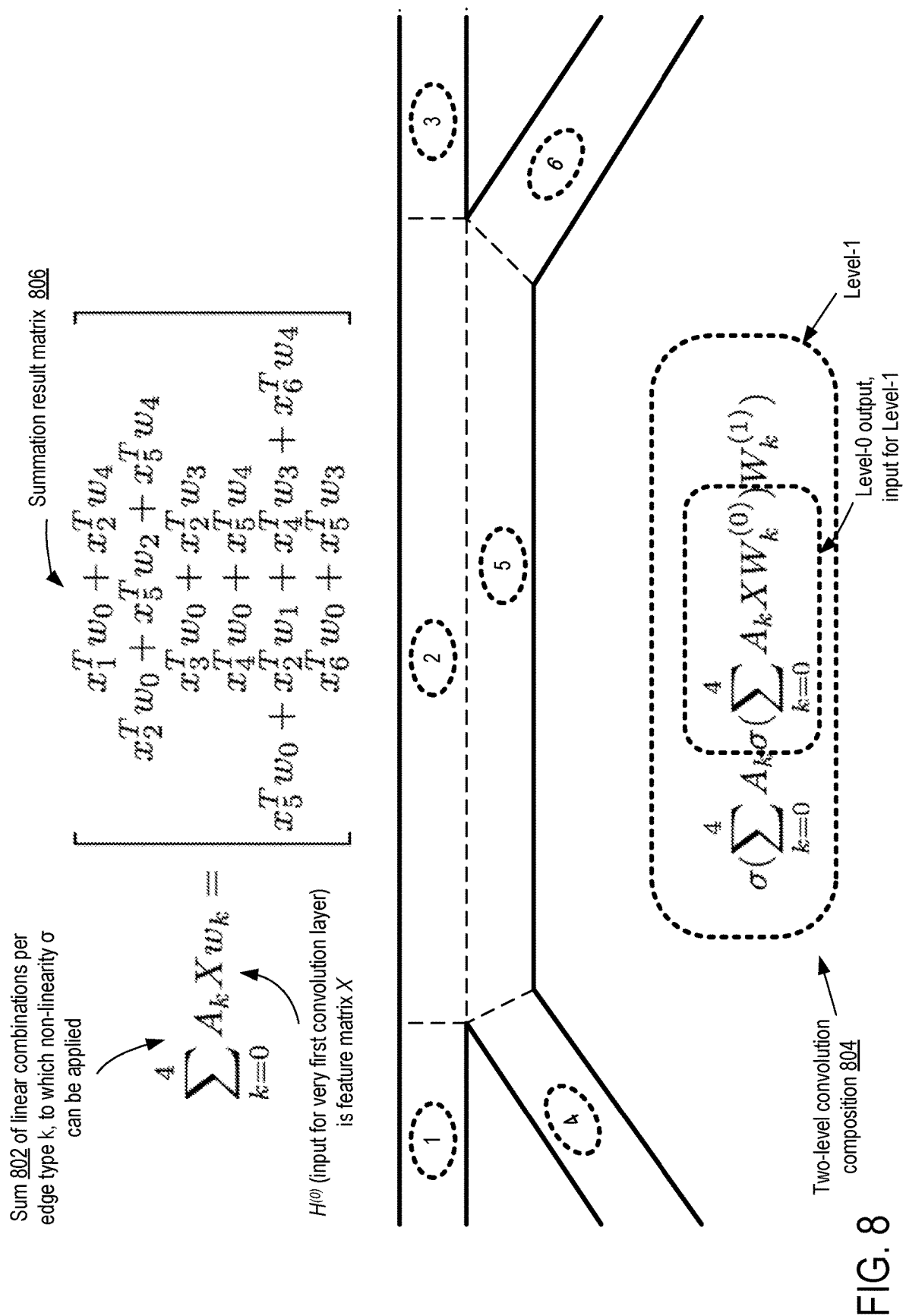
FIG. 8 illustrates an intermediate summation operation associated with a propagation function of a first convolution layer at a neural network-based machine learning model to which the homogenized graph discussed in the context of FIG. 6

FIG. 8 illustrates an intermediate summation operation associated with a propagation function of a first convolution layer at a neural network-based machine learning model to which the homogenized graph discussed in the context of FIG. 6 and FIG. 7 is provided as input, according to at least some embodiments. Recall that in formulation 550 shown in FIG. 5, the input $H^{(l)}$ for l=0 (the initial or first convolution layer) may comprise the feature matrix X representing the nodes of the homogenized graph. Using the values for the adjacency matrices shown in FIG. 7 and the feature matrix shown in FIG. 6, the sum 802 may be computed as shown. This linear sum of the products of the edge-type-specific adjacency matrices, the feature vector X (received from the input layer of the network) and a vector $w_k$ representing learned weights associated with respective edge types, summed over the edge types 0 through 4, may in turn be processed using a non-linear transformation σ in some embodiments to obtain the overall propagation function. The linear combination may be computed for every node of the graph in the depicted embodiment, which may correspond to a convolution stride of one.

It is noted that one or more weights may be shared in different rows of the matrix 806 obtained from the homogenized graph representation of the tactical map in the depicted embodiment—e.g., $w_4$ occurs in rows 1, 2, 4 and 5, $w_3$ occurs in rows 3, 5 and 6, and so on. This weight-sharing may, for example, result in more efficient learning than if all the weights for all of the nodes were different. In some embodiments, pooling may optionally be implemented at the neural network by combining lane segments using a set of defined rules. Note that as presented in FIG. 8, only nodes that are one "hop" away (share an immediate edge) are present in the convolution. To increase the window size of the convolution, in some embodiments pairs of adjacency matrices may be multiplied with one another (e.g., a new adjacency matrix A5 may be generated by multiplying A4 and A1).

In at least some embodiments, as discussed earlier, multiple layers or compositions (such as composition 804) may be applied, e.g., using respective layer groups of neural network nodes as discussed earlier. The output of one convolution layer (e.g., level-0) may be consumed as the input (H) of the next layer (e.g., level-1) in such embodiments. The number of convolution layers used may, for example, depend on the types and granularities of the queries which are to be answered (which in turn correspond to the kinds of reasoning to be performed) using the neural network-based model in different embodiments. In FIG. 8, the notation $w_k$ for k=0, K (in this example K=4) of sum 802 corresponds to one convolution, while the notation $W_k$ for k=0, K of the composition 804 corresponds to multiple convolutions.

Figure 9:
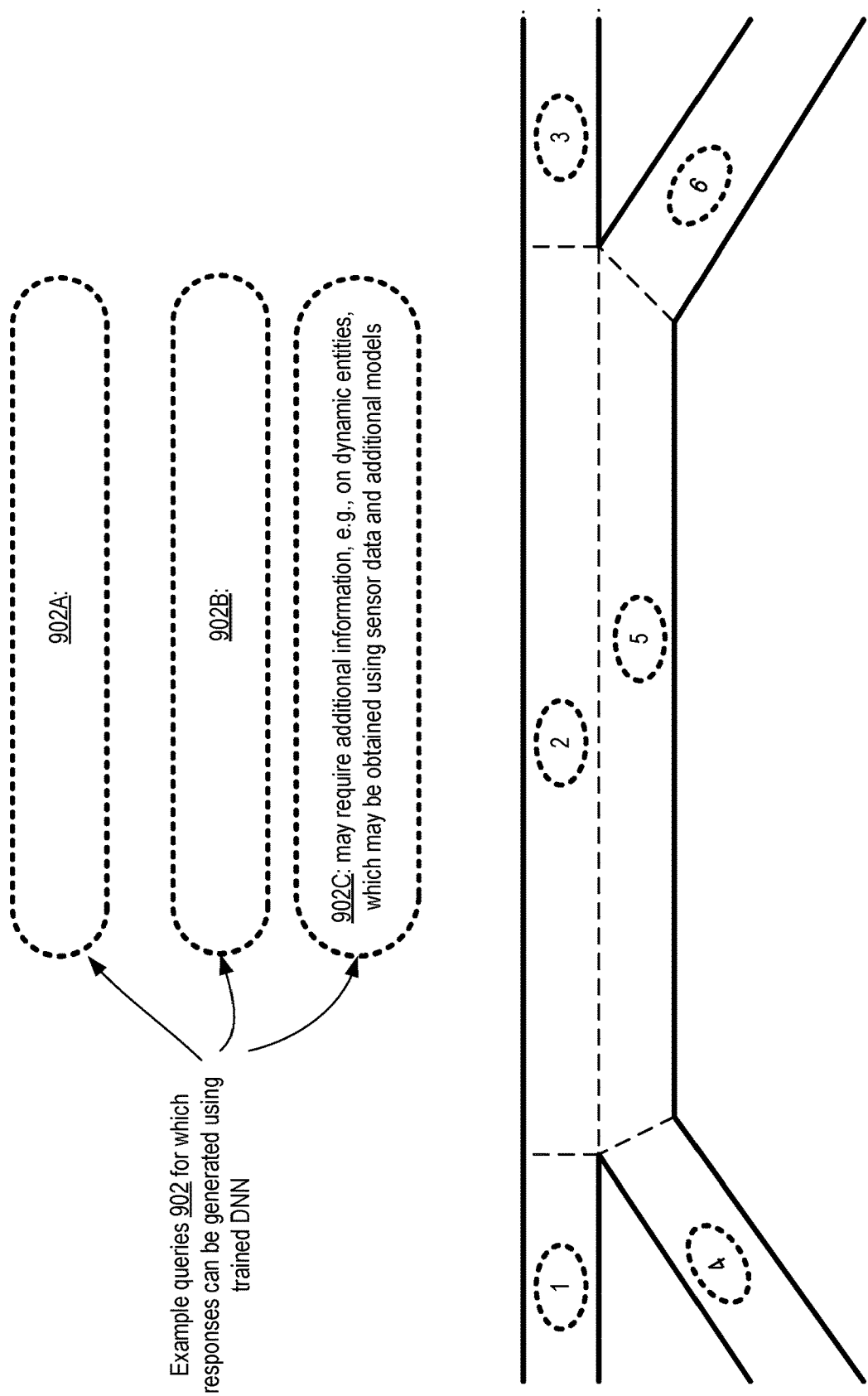
FIG. 9 illustrates example queries to which responses may be generated using a neural network-based machine learning model similar to that discussed in the content of FIG. 8, according to at least some embodiments.

FIG. 9 illustrates example queries to which responses may be generated using a neural network-based machine learning model similar to that discussed in the content of FIG. 8, according to at least some embodiments. In various embodiments, the neural network-based model may be trained to reason about graph data structures, and provide one or more different types of results of such reasoning. In some embodiments, such results may comprise respective responses to one or more types of queries pertaining to the vehicle and the environment components represented in the tactical map and homogenized graph. In at least one embodiments, respective scores associated with several different potential specific responses to a given query may be generated. The specific responses with the highest scores may be used, e.g., in combination with results of other analyses of moving objects and the like, to determine motion control directives to be used to achieve desired vehicle trajectories.

In the depicted embodiment, three example queries 902 (query 902A, 902B and 902C) are shown, for which responses may be generated using a trained deep neural network model such as a graph convolutional neural network of the kind discussed earlier. Some queries, such as 902A, may request geometrical or topological information about static components including lane segments and the like: e.g., the total arc length along some combination of adjacent lane segments (LS1, LS2, LS3) may be requested in query 902A. Other queries may request information about feasible or legal movements of the vehicle with respect to some set of static components—e.g., query 902B may pertain to the legality of exiting from the road/highway via a particular lane segment (LS3). Some queries may require combining additional information, e.g., results of analysis of dynamic/moving objects, with the reasoning regarding static components of the tactical map—e.g., the query 902C regarding the current safest path from one lane segment to another. In at least some embodiments, outputs of a neural network based model trained to reason about graph representations of tactical maps may comprise other types of objects or data. For example, in one embodiment, a reproduction of the tactical map or corresponding homogenized graph may be generated as part of the output using learned weights in internal or hidden layers of the model, with the accuracy of the reproduction indicating how well the model has learned or reasoned about the input.

Figure 10:
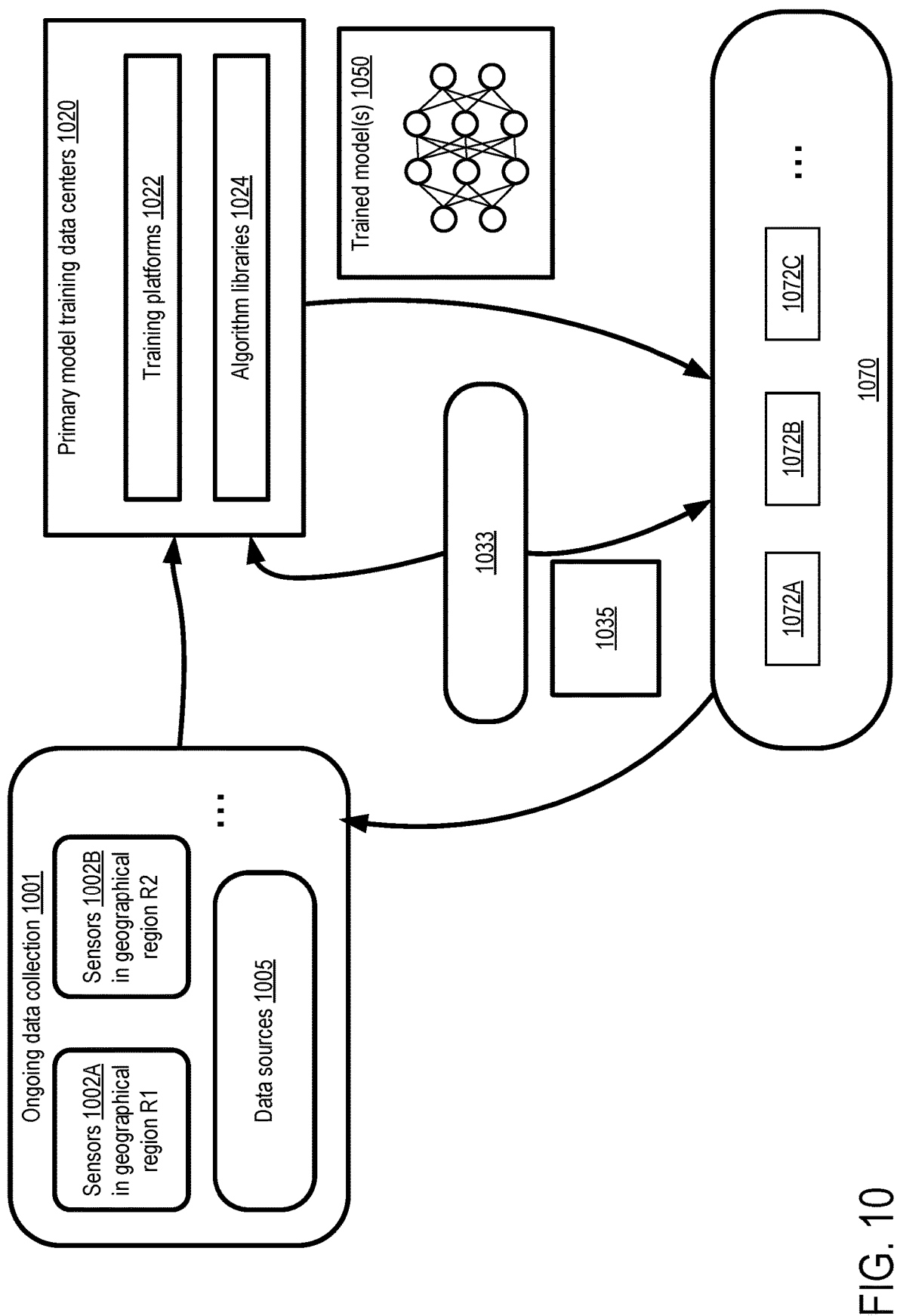
FIG. 10 illustrates an overview of example stages of developing, deploying and using machine learning models for autonomous vehicles, according to at least some embodiments.

FIG. 10 illustrates an overview of example stages of developing, deploying and using machine learning models for autonomous vehicles, according to at least some embodiments. As shown, as part of a continuous or ongoing data collection procedure 1001, data about driving environments may be collected from a variety of vehicle-based sensors in numerous geographical regions such as R1 and R2. The set of sensors at a given vehicle may comprise, among others, externally-oriented cameras, occupant-oriented sensors (which may, for example, include cameras pointed primarily towards occupants' faces, or physiological signal detectors such as heart rate detectors and the like, and may be able to provide evidence of the comfort level or stress level of the occupants), Global Positioning System (GPS) devices, radar devices, LIDAR (light detection and ranging) devices, sensors associated with vehicle motion-control subsystems such as brakes, accelerator pedals, steering wheels, and so on. In addition to conventional video and/or still cameras, in some embodiment near-infrared cameras and/or depth cameras may be used. The raw sensor data may be transformed into higher level abstractions or objects prior to further analysis in at least some embodiments, e.g., using one or more perception subsystems. In addition to the vehicle sensors, data about driving environments may also be collected from extra-vehicular data sources 1005 in at least some embodiments. Such data sources may include, for example, databases of traffic laws, accident reports, mapping services and the like. In order to train neural network models for homogenized graph representations of static components of vehicle environments, a number of tactical maps may be obtained from sources 1033 in at least some embodiments.

The data may be aggregated at one or more primary model training data centers 1020 in the depicted embodiment. The data centers may comprise numerous computing platforms, storage platforms and the like, from which some number of training platforms 1022 may be selected to train and evaluate neural network-based models 650 using any of a variety of machine learning algorithms of a library 1024. Trained models 1050, which may for example the types of models discussed earlier, may be transmitted to autonomous vehicles 1072 (e.g., AV 1072A-1072C) of fleets 1070 in the depicted embodiment. The trained models may be executed using local computing resources at the autonomous vehicle, the current set of relevant tactical maps 1035 and data collected by local sensors of the autonomous vehicles, e.g., to predict vehicle environment states, generate motion control directives to achieve vehicle trajectories which meet safety, efficiency and other desired criteria, and so on. At least a subset of the decisions made at the vehicle, as well as the local sensor data collected, may be transmitted back to the data centers as part of the ongoing data collection approach, and uses to improve and update the models in various embodiments. In some embodiments, updated versions of the models may be transmitted to the autonomous vehicle fleet from the data centers periodically, e.g., as improvements in the model accuracy and/or efficiency are achieved. In at least one embodiment, respective versions of models may be generated for several sub-domains—e.g., one model may be generated for large trucks, another for passenger cars, and so on, and the appropriate models may be transmitted to autonomous vehicles of different types. Similarly, in some embodiments, geography-specific models may be generated and transmitted to autonomous vehicles for execution in the corresponding regions or countries.

Figure 11:
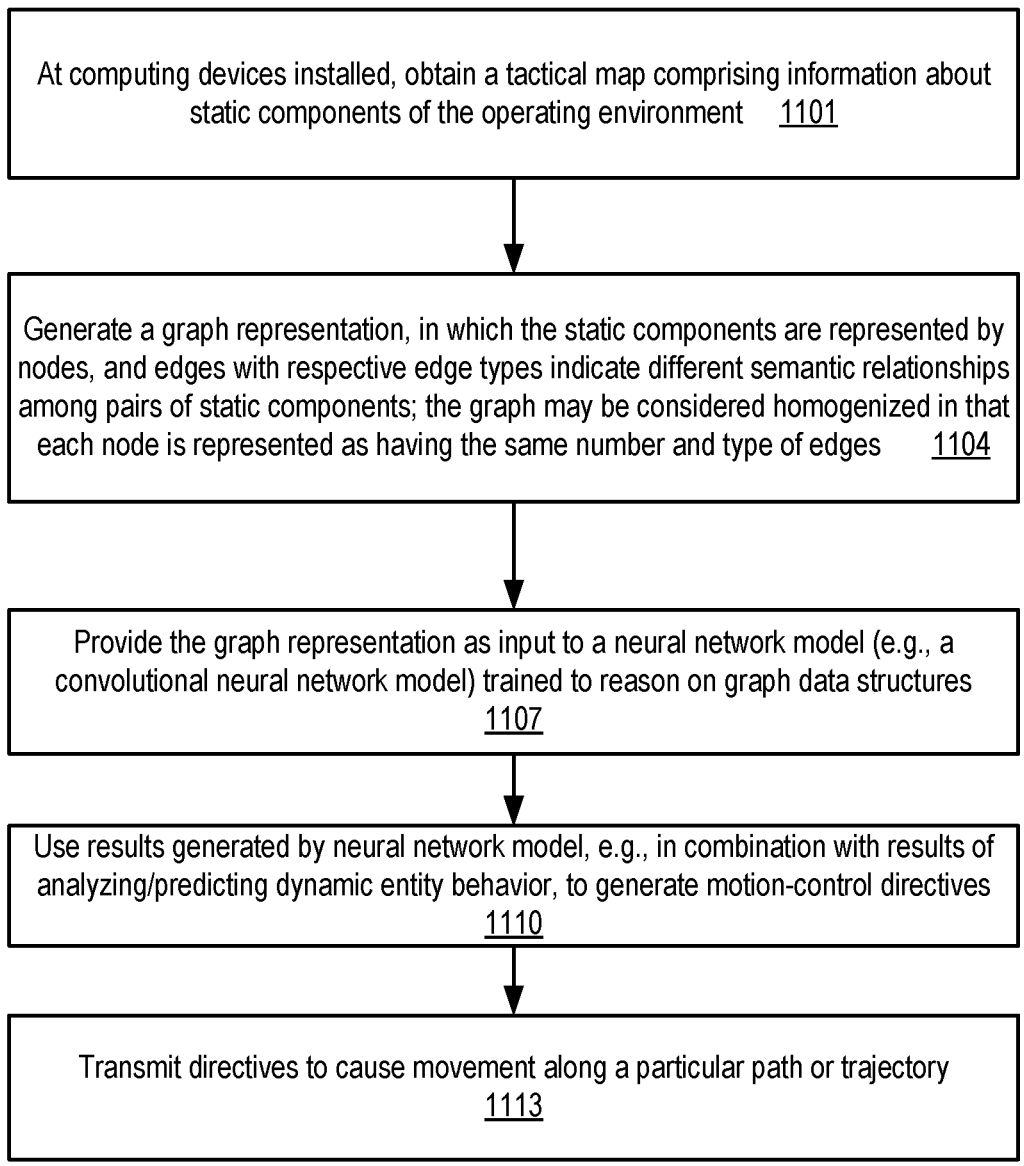
FIG. 11 illustrates aspects of operations which may be performed to analyze graph representations of tactical maps at autonomous vehicles using neural network-based machine learning models, according to at least some embodiments.

FIG. 11 is a flow diagram illustrating aspects of operations which may be performed to analyze graph representations of tactical maps at autonomous vehicles using neural network-based machine learning models, according to at least some embodiments. As shown in element 1102, a tactical map comprising information about static components of the operating environment of a vehicle may be obtained at one or more computing devices. The tactical map may, for example, comprise information about objects/entities such as road/highway lane segments, intersections, traffic signs and the like, attributes of individual objects, and relationships (e.g., geometric or topographical relationships) among pairs or groups of the objects. Any of a number of formats or languages may be used for the raw tactical maps—e.g., variants of JSON, WL, or proprietary map markup languages may be used.

A homogenized graph representation of the tactical map, in which the static components are represented by nodes, and edges with respective edge types indicate different semantic relationships among pairs of static components may be generated (element 1104). The graph may be said to be homogenized in that each node may be represented as having the same number and type of edges, arranged in the same order in some embodiments. In at least one embodiment, at least some of the computations involved in generating the homogenized graph representation may be performed using resources outside the vehicle—e.g., a homogenized graph generator intermediary device at a data center or a tactical map source may convert the raw tactical maps into the homogenized graphs and then transmit them to the vehicle.

The homogenized graph representation may be provided as input to a neural network model (such as a convolutional graph neural network, a more general graph neural network, a relational network or the like as discussed earlier) which has been trained to reason on graph data structures (element 1107). Results generated by the neural network model (such as responses to queries of the kinds discussed above) may be used, in combination with results of other models trained for analysis/prediction regarding dynamic entities, sensor data analysis and the like, to generate motion control directives in at least some embodiments (element 1110). The directives may be transmitted to vehicle control subsystems (e.g., subsystems for braking/steering/accelerating the vehicle) to cause the vehicle to move along a particular path or trajectory in various embodiments (element 1113).

It is noted that in various embodiments, at least some operations other than those illustrated in the flow diagram of FIG. 11 may be used to implement the techniques for reasoning regarding graph representations of tactical maps described above. Some of the operations shown may not be implemented in some embodiments or may be implemented in a different order, or in parallel rather than sequentially.

In some embodiments, computations of the modeling and analysis components associated with an autonomous vehicle may be performed in a distributed manner, e.g., using local resources located in the vehicle itself as well as remote resources. A remote data center may comprise, for example, one or more pools of compute resources, such as virtual or physical servers. In some embodiments, at least some resource pools or individual servers of a data center may be optimized for performing machine learning operations—e.g., some servers may use graphical processing units (GPUs) more suitable for neural network algorithms than conventional CPUs. The resources of the data center may be used to train and run at least some of the machine learning models (including for example the kinds of deep neural networks discussed above) used by the local decision making components of the autonomous vehicles; thus, the decision making components in effect may comprise some on-board components local to the vehicles and some remote components in some embodiments. The data center may also store one or more databases (e.g., comprising tactical maps, local regulations, and the like for some area or region) in some embodiments.

A given autonomous vehicle may comprise a respective set of on-board computing resources, as well as a respective dynamically-updated local cache in some embodiments. Depending for example on the current location of a vehicle and/or the identities of the current occupants, the caches may be updated periodically from a data center's databases. For example, city-specific or neighborhood-specific traffic rules may be loaded into the caches as needed, occupant preferences (such as the relative weights to be assigned to different factors when selecting actions to be taken) may be updated when occupants change, and so on. It is noted that not all the autonomous vehicles may incorporate equivalent local computing resources—e.g., some vehicle models may contain more powerful processing devices and/or larger caches than others.

Based at least in part on the quality of the network connectivity between the autonomous vehicles and the data center, different relative amounts of motion decision-related processing may be performed locally using on-board resources versus remotely in various embodiments. In general, the autonomous vehicles may attempt to establish and maintain high-bandwidth and low-latency communication channels with the data center. If the quality of the connectivity is high, data may be transmissible at a high rate and with high fidelity to/from the data center, and as a result a larger fraction of the computations needed for vehicle motion-related decisions, may be performed at the data center. In contrast, if the connectivity is of lower quality, a larger fraction of the decision-making logic may have to be implemented using on-board resources. In at least one embodiment, the tasks of collecting and processing sensor data, and the motion selector's operations, may be performed using local computing resources, while it may be possible (although not required) to perform at least a fraction of higher-level state prediction functions and/or behavior planner functions at the data center. In various embodiments, because of the possibility of poor connectivity with the remote data center, the decision-making components of the vehicle may be designed such that they are capable of planning the vehicle's movements appropriately and safely even if communications with the data center are not feasible for extended periods of time.

Figure 12:
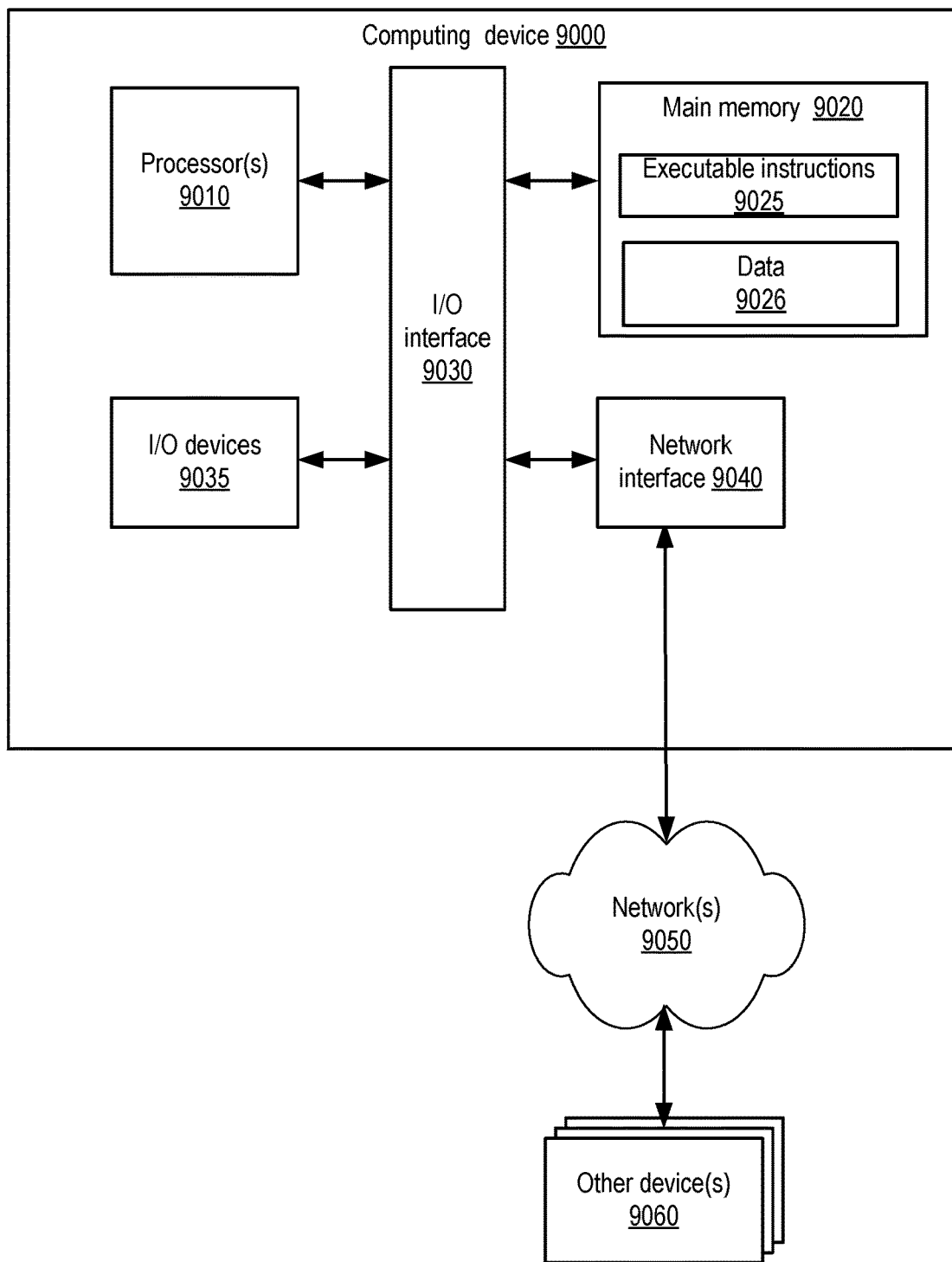
FIG. 12 is a block diagram illustrating an example computing device that may be used in at least some embodiments.

In at least some embodiments, a server that implements a portion or all of one or more of the techniques for analyzing and reasoning about tactical maps described herein, including the techniques to collect, obtain or process sensor signals of various types, to generate homogenized graph representations of tactical maps, train and execute machine learning algorithms including neural network algorithms and the like, may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a main memory 9020 (which may comprise both non-volatile and volatile memory modules, and may also be referred to as system memory) via an input/output (I/O) interface 9030. Computing device 9000 further includes a network interface 9040 coupled to I/O interface 9030, as well as additional I/O devices 9035 which may include sensors of various types.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

Memory 9020 may be configured to store instructions and data accessible by processor(s) 9010. In at least some embodiments, the memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, executable program instructions 9025 and data 1926 implementing one or more desired functions, such as those methods, techniques, and data described above, are shown stored within main memory 9020.

In one embodiment, I/O interface 9030 may be configured to coordinate I/O traffic between processor 9010, main memory 9020, and various peripheral devices, including network interface 9040 or other peripheral interfaces such as various types of persistent and/or volatile storage devices, sensor devices, etc. In some embodiments, I/O interface 9030 may perform any necessary protocol, timing or other data transformations to convert data signals from one component (e.g., main memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, main memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as main memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12, and/or multiple storage media may be used to implement the described functionality in various embodiments; for example, software components running on a variety of different devices and servers using one or more processors may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
    performing, at one or more computing devices:
        obtaining a first tactical map associated with an environment of a first vehicle, wherein the first tactical map indicates at least a plurality of static components of the environment;
        generating a homogenized graph representation of the first tactical map comprising a plurality of nodes and a plurality of edges, wherein individual ones of the nodes represent respective static components, wherein individual ones of the edges represent respective relationships between multiple static components, wherein an edge type indicative of relationship semantics of a first edge associated with a first node differs from an edge type of a second edge associated with the first node, and wherein the number of edges associated with the first node of the graph is equal to the number of edges associated with individual ones of one or more other nodes of the graph;
        obtaining, using the homogenized graph representation as input to a neural network-based machine learning model, at least a first set of reasoning results pertaining to the first vehicle and one or more static components; and
        transmitting, to a motion-control subsystem of the first vehicle, one or more motion-control directives based at least in part on the first set of reasoning results.

2. The method as recited in claim 1, wherein the first neural network-based machine learning model comprises one or more convolution layers.

3. The method as recited in claim 2, wherein a propagation function of a particular convolution layer of the one or more convolution layers comprises a non-linear function.

4. The method as recited in claim 2, wherein a propagation function of a particular convolution layer of the one or more convolution layers comprises a summation, over one or more edge types, of a product of at least (a) an adjacency matrix associated with an edge type (b) input received from another layer of the neural network and (c) a vector representing learned weights associated with respective edge types.

5. The method as recited in claim 1, wherein the first node represents one or more of: (a) a lane segment of a road, (b) an intersection, (c) a traffic sign, (d) a traffic signal or (e) a pedestrian walkway.

6. The method as recited in claim 1, wherein a particular edge of the homogenized graph representation indicates one or more of: (a) a geometric constraint associated with at least a pair of static components, (b) a topological constraint associated with at least a pair of static components or (c) one or more attributes associated with at least a pair of static components.

7. The method as recited in claim 1, further comprising performing, by the one or more computing devices:
    analyzing, using one or more machine-learning models, a representation of one or more moving objects in the environment of the first vehicle, wherein the one or more motion-control directives are based at least in part on results of said analyzing.

8. The method as recited in claim 1, wherein the first set of reasoning results includes a probabilistic response to a query pertaining to a movement of the first vehicle from one lane segment to another.

9. A system, comprising:
    one or more computing devices;
    wherein the one or more computing devices are configured to:
        generate a graph representation of a first tactical map, wherein the first tactical map comprises information pertaining to a plurality of static components of an environment of a vehicle, wherein the graph representation comprises a plurality of nodes and a plurality of edges, wherein individual ones of the nodes represent respective static components, wherein individual ones of the edges represent respective relationships between multiple static components, and wherein an edge type indicative of relationship semantics of a first edge associated with a first node differs from an edge type of a second edge associated with the first node;
        obtain, using at least a portion of the graph representation as input, a first set of results from a neural network-based machine learning model; and
        transmit, to a motion-control subsystem of the first vehicle, one or more motion-control directives based at least in part on the first set of results.

10. The system as recited in claim 9, wherein the first neural network-based machine learning model comprises one or more of: (a) a graph neural network, or (b) a relational network.

11. The system as recited in claim 9, wherein the first node represents one or more of: (a) a lane segment of a road, (b) an intersection, (c) a traffic sign, (d) a traffic signal or (e) a pedestrian walkway.

12. The system as recited in claim 9, wherein the first node represents a first lane segment, wherein the graph representation indicates a plurality of properties of the first lane segment including one or more of: (a) a speed limit, (b) a recommended speed, (c) a proceed-with-caution indicator, (d) a must-stop indicator, (e) a keep-clear indicator, (f) a must-not-enter indicator, (g) a stop-if-able indicator, (h) a bid-directional indicator, (i) a geometry indicator or (j) a lane type.

13. The system as recited in claim 9, wherein a particular edge of the graph representation links the first node to a second node, wherein the first node represents a first lane segment, wherein the second node represents a second lane segment, and wherein the edge type of the particular edge indicates one or more of: (a) whether the second lane segment is to the left of the first lane segment, (b) whether the second lane segment is to the right of the first lane segment, (c) whether the second lane segment is a previous lane segment along a particular path with respect to the first lane segment, (d) whether the second lane segment is a next lane segment along a particular path with respect to the first lane segment, (e) whether the second lane segment overlaps with the first lane segment, (f) whether the second lane segment is coincident with the first lane segment, (g) whether the second lane segment represents a traffic island with respect to the first lane segment, or (h) a permeability of the second lane segment with respect to the first lane segment.

14. The system as recited in claim 9, wherein the one or more computing devices are configured to:
 analyze, using one or more machine learning models, a representation of one or more moving objects in the environment of the first vehicle, wherein the one or more motion-control directives are based at least in part on results of analyzing the representation of the one or more moving objects.

15. One or more non-transitory computer-accessible storage media storing program instructions that when executed on or across one or more processors cause the one or more processors to:
 generate a graph representation of at least a first tactical map, wherein the first tactical map comprises information pertaining to a plurality of static components of an environment of a vehicle, wherein the graph representation comprises a plurality of nodes and a plurality of edges, wherein individual ones of the nodes represent respective static components, wherein individual ones of the edges represent respective relationships between multiple static components, and wherein an edge type indicative of relationship semantics of a first edge associated with a first node differs from an edge type of a second edge associated with the first node;
 obtain, using at least a portion of the graph representation as input, a first set of results from a neural network-based machine learning model; and
 transmit, to a motion-control subsystem of the first vehicle, one or more motion-control directives based at least in part on the first set of results.

16. The one or more non-transitory computer-accessible storage media as recited in claim 15, wherein the first neural network-based machine learning model comprises one or more convolution layers.

17. The one or more non-transitory computer-accessible storage media as recited in claim 15, wherein the instructions when executed on or across the one or more processors cause the one or more processors to:
 obtain, via network communications, a plurality of tactical maps, including the first tactical map, during a journey from a source to a destination;
 generate respective graph representations of individual ones of the tactical maps; and
 provide the respective graph representations as input to the neural network-based machine learning model; and
 utilize respective sets of results obtained from the neural network-based machine learning model to determine respective sets of motion-control directives.

18. The one or more non-transitory computer-accessible storage media as recited in claim 15, wherein the first node represents one or more of: (a) a lane segment of a road, (b) an intersection, (c) a traffic sign, (d) a traffic signal or (e) a pedestrian walkway.

19. The one or more non-transitory computer-accessible storage media as recited in claim 15, wherein a particular edge of the graph representation indicates one or more of: (a) a geometric constraint associated with at least a pair of static components, (b) a topological constraint associated with at least the pair of static components or (c) one or more attributes associated with at least the pair of static components.

20. The one or more non-transitory computer-accessible storage media as recited in claim 15, wherein the graph representation comprises one or more nodes representing respective dynamic components of the environment, and wherein at least one edge of the graph indicates a relationship between a particular dynamic component and a particular static component.

\* \* \* \* \*